US008756498B2

(12) United States Patent
Nakajima

(10) Patent No.: US 8,756,498 B2
(45) Date of Patent: Jun. 17, 2014

(54) ELECTRONIC APPARATUS WITH DICTIONARY FUNCTION AND COMPUTER-READABLE MEDIUM

(75) Inventor: Daisuke Nakajima, Fussa (JP)

(73) Assignee: Casio Computer Co., Ltd, Tokyo (JP)

( * ) Notice: Subject to any disclaimer, the term of this patent is extended or adjusted under 35 U.S.C. 154(b) by 597 days.

(21) Appl. No.: 12/951,163

(22) Filed: Nov. 22, 2010

(65) Prior Publication Data

US 2011/0131487 A1 Jun. 2, 2011

(30) Foreign Application Priority Data

Nov. 27, 2009 (JP) ................................ 2009-270517

(51) Int. Cl.
*G06F 17/00* (2006.01)

(52) U.S. Cl.
USPC .......................................... 715/259; 715/230

(58) Field of Classification Search
USPC .................... 715/259, 255–256, 230
See application file for complete search history.

(56) References Cited

U.S. PATENT DOCUMENTS

| 5,663,748 | A | 9/1997 | Huffman et al. |
| 5,822,720 | A | 10/1998 | Bookman et al. |
| 6,085,204 | A * | 7/2000 | Chijiwa et al. ................ 715/246 |
| 6,553,103 | B1 | 4/2003 | Forlenza et al. |
| 7,865,816 | B2 * | 1/2011 | Tanaka .......................... 715/230 |
| 2002/0036652 | A1 * | 3/2002 | Masumoto et al. ........... 345/732 |
| 2002/0124018 | A1 * | 9/2002 | Fifield et al. ................... 707/512 |
| 2002/0198859 | A1 * | 12/2002 | Singer et al. ..................... 707/1 |
| 2003/0050927 | A1 * | 3/2003 | Hussam ............................ 707/5 |
| 2004/0201633 | A1 * | 10/2004 | Barsness et al. ............... 345/864 |
| 2004/0205671 | A1 * | 10/2004 | Sukehiro et al. .............. 715/532 |
| 2004/0260687 | A1 * | 12/2004 | Mano ................................ 707/3 |
| 2005/0149860 | A1 * | 7/2005 | Murata .......................... 715/513 |
| 2008/0046845 | A1 * | 2/2008 | Chandra ........................ 715/856 |
| 2008/0140626 | A1 * | 6/2008 | Wilson ............................. 707/3 |
| 2009/0216752 | A1 * | 8/2009 | Terui et al. ....................... 707/5 |
| 2012/0240038 | A1 * | 9/2012 | Curtis ........................... 715/256 |

FOREIGN PATENT DOCUMENTS

| JP | 06-266766 | 9/1994 |
| JP | 10-187756 | 7/1998 |
| JP | 2002-328948 | 11/2002 |

(Continued)

OTHER PUBLICATIONS

Japanese Office Action for Japanese Application No. 2009-270517 mailed on Feb. 14, 2012.

(Continued)

*Primary Examiner* — Thu Huynh
(74) *Attorney, Agent, or Firm* — Amin, Turocy & Watson, LLP

(57) ABSTRACT

On a content display screen corresponding to a searched item of an arbitrary dictionary, for example, an important item, an important year, and an important event are marked with a magenta highlighter, a blue highlighter, and a yellow highlighter, respectively. Then, position information of a highlighter range in the searched item of the dictionary is registered for each color in a highlighter information database, and the item name of the dictionary is associated with highlighter existence data for each color and registered in a wordbook database of Wordbook n selected by the user. When an arbitrary Wordbook n registered in the wordbook database is selected and called up, each item name registered in the selected wordbook is associated with a color mark according to the highlighter existence data for each color and displayed in a registered wordlist screen. Accordingly, a desired registered word can be quickly selected.

9 Claims, 16 Drawing Sheets

(56) References Cited

FOREIGN PATENT DOCUMENTS

| JP | 2004-213299 | 7/2004 |
|---|---|---|
| JP | 2005-292303 | 10/2005 |
| JP | 2006-228046 | 8/2006 |
| JP | 2006-293186 | 10/2006 |
| JP | 2008-123154 | 5/2008 |
| KR | 1020080099389 | 11/2008 |
| WO | 01/42980 A1 | 6/2001 |
| WO | 2008140193 | 11/2008 |

OTHER PUBLICATIONS

Extended European Search Report for European Patent Application No. 10192481.9 mailed on Jun. 1, 2011.
Murray, et al. Using the highlight tool; Working with hidden text, MS Office Work 2007 Inside Out, 2007, pp. 145-147, XP002637908, Redmond, Washington.
Korean Office Action for Korean Application No. 10-2010-0118911 mailed on Jun. 8, 2012.
Japanese Office Action for Japanese Patent Application No. 2009-270517 mailed on Jul. 19, 2011.
First Office Action of Reason for Rejection for Japanese Patent Application No. 2012-252822 Dated Jan. 21, 2014, 6 pgs.
First Office Action of Reason for Rejection for Japanese Patent Application No. 2012-252823 Dated Jan. 21, 2014, 7 pgs.

* cited by examiner

FIG.3

22c HIGHLIGHTER INFORMATION DATABASE

| CONTENT NAME | ITEM KIND | ITEM NAME | CHARACTER POSITION OF HIGHLIGHTER | | |
|---|---|---|---|---|---|
| | | | MAGENTA | YELLOW | BLUE |
| JAPANESE HISTORY ABRIDGED DICTIONARY | DIRECTION WORD | やましろのくにいっき | 1 - 18 | | 19 - 29 |
| L ENGLISH-ENGLISH DICTIONARY | DIRECTION WORD | trust | 1 - 6 | 59 - 94 | 18 - 23 |
| ... | ... | ... | ... | ... | ... |

FIG.4

22d WORDBOOK DATABASE

| No. | WORDBOOK NAME | CONTENT INFORMATION | | ITEM KIND | ITEM NAME | EXISTENCE/NONEXISTENCE OF HIGHLIGHTER | | | |
|---|---|---|---|---|---|---|---|---|---|
| | | CATEGORY | CONTENT NAME | | | MAGENTA | YELLOW | BLUE | CHECKMARK |
| 1 | WORDBOOK 1 | HISTORY | JPN HISTORY ABRIDGED DICTIONARY | DIRECTION WORD | やましろのくにいっき | ○ | | | |
| 2 | WORDBOOK 2 | ENGLISH | L ENG-ENG | DIRECTION WORD | trust | ○ | ○ | ○ | |
| 3 | WORDBOOK 1 | ENGLISH | G ENG-JPN | DIRECTION WORD | report | | ○ | | |
| 4 | WORDBOOK 1 | ENGLISH | G ENG-JPN | DIRECTION WORD | break | | | ○ | ○ |
| 5 | WORDBOOK 3 | HISTORY | WORLD HISTORY ABRIDGED DICTIONARY | SET PHRASE | アーヘンの和約 | ○ | ○ | ○ | |
| 6 | WORDBOOK 4 | ENGLISH | G ENG-JPN | DIRECTION WORD | against the book | | ○ | | |
| 7 | WORDBOOK 1 | ENGLISH | G ENG-JPN | DIRECTION WORD | crown | | | ○ | ○ |
| 8 | WORDBOOK 1 | JAPANESE | HAIKU SAIJIKI | EXAMPLE SENTENCE | あおい【葵】夏六月 | ○ | ○ | | |
| 9 | WORDBOOK 2 | ENGLISH | G ENG-JPN | ... | Alex spoke Portugu... | | | | |
| ... | ... | ... | ... | ... | ... | ... | ... | ... | ... |

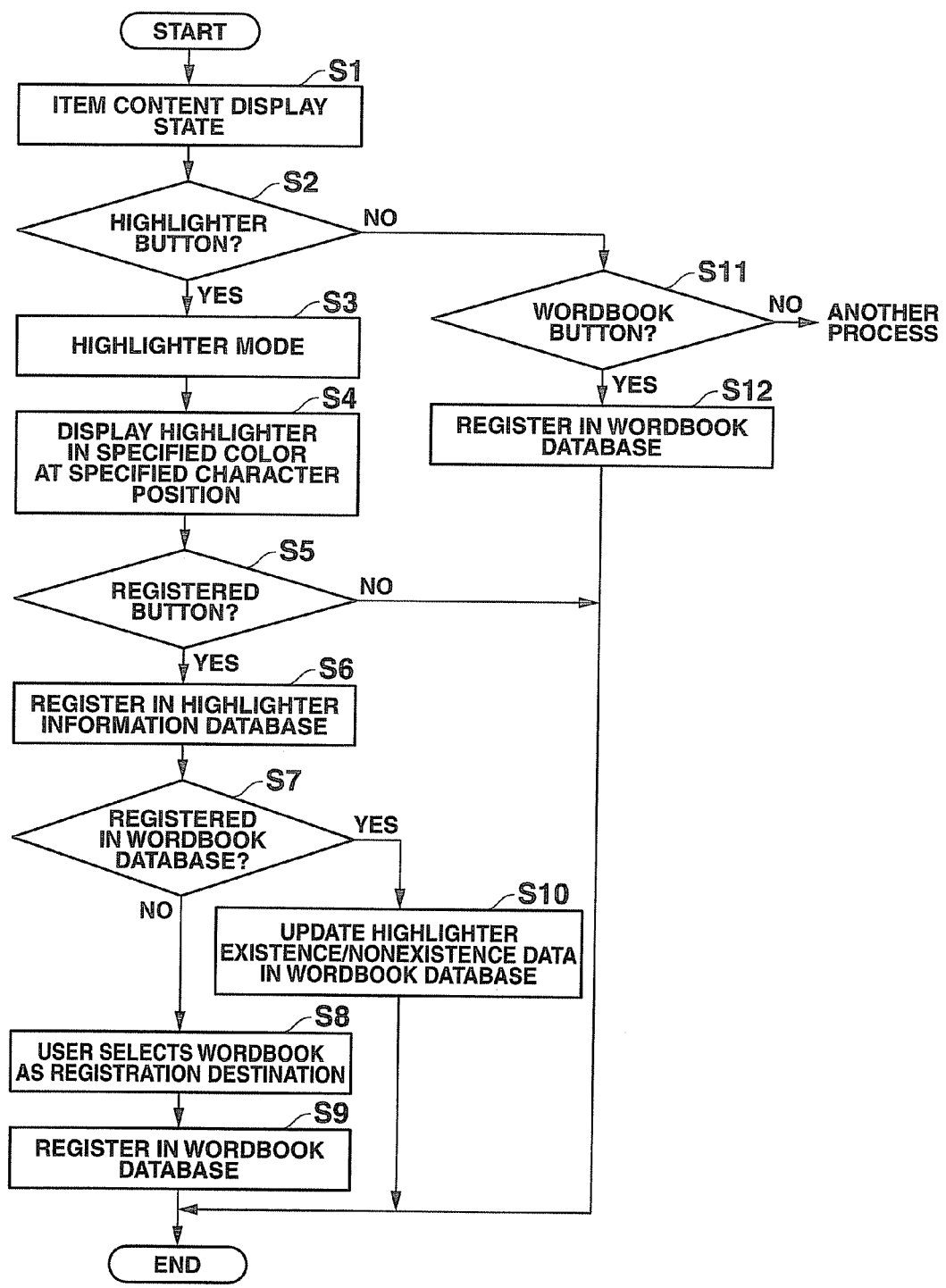

ELECTRONIC APPARATUS WITH DICTIONARY FUNCTION AND COMPUTER-READABLE MEDIUM

CROSS-REFERENCE TO RELATED APPLICATIONS

This application is based upon and claims the benefit of priority from prior Japanese Patent Application No. 2009-270517, filed Nov. 27, 2009, the entire contents of which are incorporated herein by reference.

BACKGROUND OF THE INVENTION

1. Field of the Invention

The present invention relates to an electronic apparatus with a dictionary function and a computer-readable medium storing a control program thereof.

2. Description of the Related Art

Conventionally, there are electronic dictionary devices equipped with a wordbook function capable of separately registering a desired item searched in a dictionary as a wordbook unique to the user, and calling up and displaying a registered word in the wordbook.

Further, there are also electronic dictionary devices equipped with a highlighter function capable of distinctively displaying a section to be noted with a highlighter on a display screen of a desired item and a content thereof searched in a dictionary.

Moreover, an electronic dictionary apparatus equipped with the wordbook function and the highlighter function in combination has also been considered.

In the conventional electronic dictionary apparatus equipped with the wordbook function and the highlighter function in combination, how a marked content to be noted exists in a registered word in a wordbook was known until the content of the registered word is called up and displayed.

Therefore, when the type of content to be marked is set according to the color of the highlighter (e.g., important historical years, important historical characters, important terms, and important related terms), it was impossible to respond to a demand to easily confirm what highlighter is assigned to each of the registered words on a list display screen of registered words.

BRIEF SUMMARY OF THE INVENTION

Accordingly, it is an object of the present invention to provide an electronic apparatus equipped with a dictionary function capable of easily confirming what highlighter is assigned to each of the registered words on a list display screen of registered words, and quickly selecting a desired registered word, and a computer-readable medium storing a control program of the electronic apparatus.

According to a first aspect of the present invention, there is provided an electronic apparatus with a dictionary function, comprising: a display device capable of providing colored display; a storage including a dictionary storage section that stores a plurality of items and contents of the items in association with one another; a memory; and a processor that performs: displaying, on the display device, an arbitrary item and a content thereof stored by the dictionary storage section; displaying, on the display device, a highlighter together with the item and content thereof displayed on the display device by adding the highlighter in a color specified according to a user operation to a range specified according to a user operation in the displayed item and content thereof; registering, in the memory, the item and the range of the highlighter for each color in the item and content thereof displayed on the display device; registering, in the memory, the item displayed on the display device as a word in a wordbook in association with data indicating existence or nonexistence of a highlighter for each color; calling up the wordbook from the memory according to a user operation; displaying, on the display device, a list including items registered as words in the wordbook, together with a color mark according to the data which indicates existence of a highlighter for each color associated with a registered item; selecting an arbitrary item according to a user operation from the items in the wordbook displayed in the list on the display device; and reading the selected item and a content thereof from the items and contents thereof stored by the dictionary storage section, and displaying the selected item and the content thereof together with a highlighter on the display device by adding the highlighter to a range in the selected item and the content thereof, according to corresponding item and range of the highlighter for each color registered in the memory.

According to a second aspect of the present invention, there is provided a computer-readable medium that stores a program executed by a computer of an electronic apparatus having a display section capable of providing color display, a storage including a dictionary storage section that stores a plurality of items and contents thereof in association with one another, and a memory, the program including a sequence of commands for causing the computer system to perform pieces of processing, the pieces of processing comprising: displaying, on the display section, an arbitrary item and a content thereof stored by the dictionary storage section; displaying, on the display section, a highlighter together with the item and content thereof displayed on the display section by adding the highlighter in a color specified according to a user operation to a range specified according to a user operation in the displayed item and content thereof; registering, in the memory, the item and the range of the highlighter for each color in the item and content thereof displayed on the display section; registering, in the memory, the item displayed on the display section as a word in a wordbook in association with data indicating existence or nonexistence of a highlighter for each color; calling up the wordbook according to a user operation from the memory; displaying, on the display section, a list including items registered as words in the wordbook, together with a color mark according to the data which indicates existence of a highlighter for each color associated with a registered item; selecting an arbitrary item according to a user operation from the items in the wordbook displayed in the list on the display section; and reading the selected item and a content thereof from the items and contents thereof stored by the dictionary storage section, and displaying the selected item and the content thereof together with a highlighter on the display section by adding the highlighter to a range in the selected item and the content thereof, according to corresponding item and range of the highlighter for each color registered in the memory.

According to a third aspect of the present invention, there is provided an electronic apparatus with a dictionary function, comprising: a dictionary storage section that stores a plurality of items and contents of the items in association with one another; a content display control section that stores an arbitrary item stored by the dictionary storage section and a content thereof; a highlighter display control section that displays a highlighter together with the item and content thereof displayed by the content display control section by adding the highlighter in a color specified according to a user operation to a range specified according to a user operation in the displayed item and content thereof; a highlighter information registration section that registers the item and the range of the highlighter for each color in the item and content thereof displayed by the highlighter display control section; a wordbook registration section that registers the item displayed by the content display control section as a word in a wordbook in association with data indicating existence or nonexistence of a highlighter for each color displayed by the highlighter display control section; a wordbook call-up section that calls up the wordbook according to a user operation; a registered wordlist display control section that displays a list including items registered as words in the wordbook, together with a color mark according to the data which indicates existence of a highlighter for each color associated with a registered item; an item selection section that selects an arbitrary item according to a user operation from the items in the wordbook displayed in the list by the registered wordlist display control section; and a selected item display control section that reads the selected item and a content thereof from the items and contents thereof stored by the dictionary storage section, and displays the selected item and the content thereof together with a highlighter by adding the highlighter to a range in the selected item and the content thereof, according to corresponding item and range of the highlighter for each color registered by the highlighter information registration section.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 illustrates contents of a highlighter information database 22c stored in a main storage device 22 of the electronic dictionary device 10;

FIG. 4 illustrates contents of a wordbook database 22d stored in the main storage device 22 of the electronic dictionary device 10;

FIG. 5 is a flowchart illustrating a color highlighter addition and wordbook registration process performed by the electronic dictionary device 10;

DETAILED DESCRIPTION OF THE INVENTION

Hereinafter, an embodiment of the present invention will be described with reference to the accompanying drawings.

Figure 1:
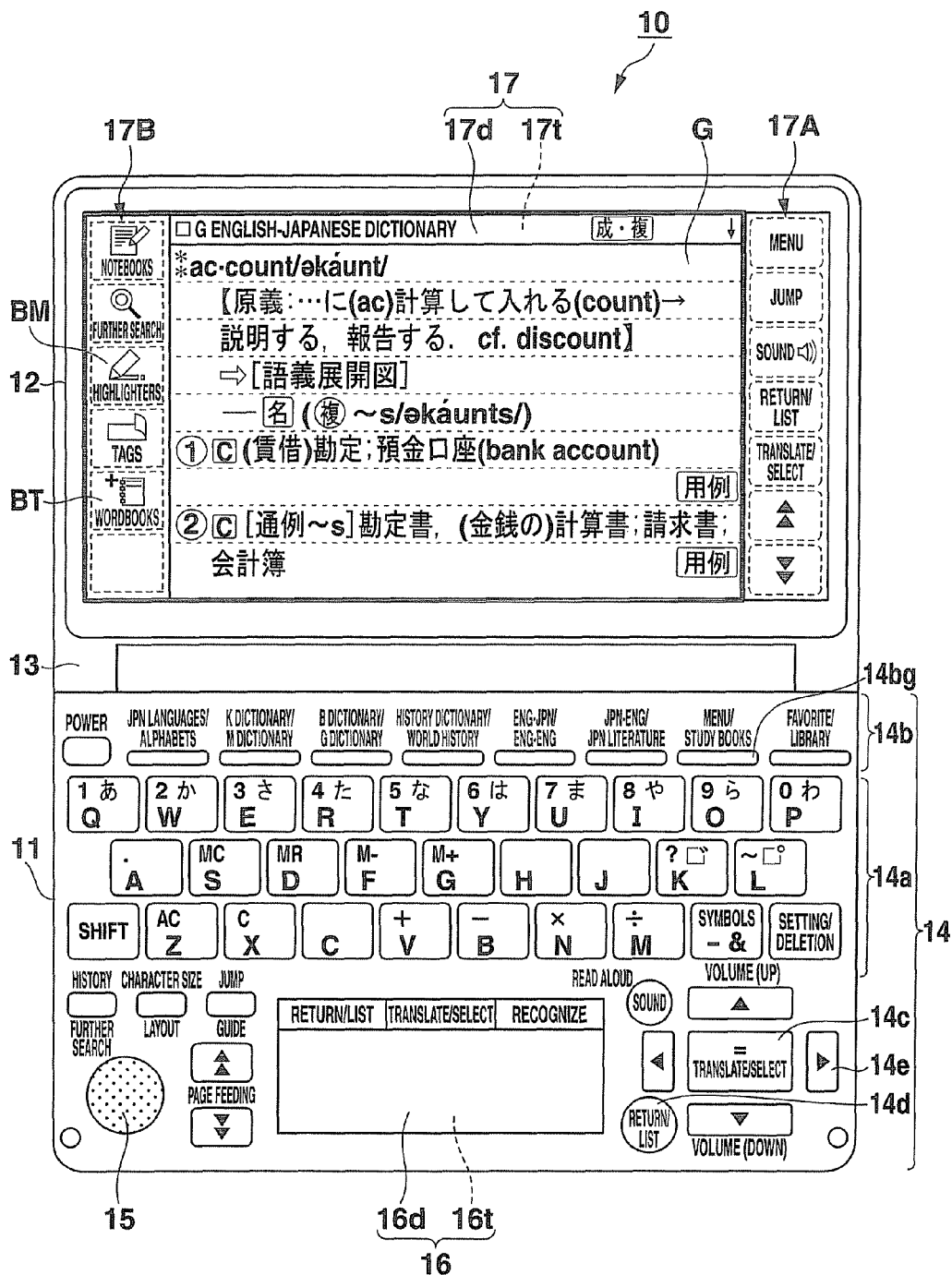
FIG. 1 is a front view of an electronic dictionary device 10 according to an embodiment of an electronic apparatus equipped with a dictionary function of the present invention.

FIG. 1 is a front view illustrating an outer configuration of an electronic dictionary device 10 according to an embodiment of an electronic apparatus equipped with a dictionary function of the present invention.

The electronic dictionary equipped with the dictionary function is formed either as a portable apparatus (the electronic dictionary device 10) dedicated to an electronic dictionary as will be described below, or a personal digital assistance (PDA), a personal computer (PC), a portable telephone, an electronic book, a portable game console, and the like.

The electronic dictionary device 10 includes a folding casing in which a body casing 11 and a lid casing 12 can be developed/folded via a hinge section 13. When the folding casing is developed, on a surface of the body casing 11, there are provided a key input section (keyboard) 14 including a character input key 14a, a dictionary specification key 14b, a "Translate/Select" key 14c, a "Return/List" key 14d, a cursor key 14e, and the like, a speaker 15, a handwriting input section (sub-screen) 16, and the like.

The handwriting input section (sub-screen) 16 has a configuration in which a touch position detection device configured to detect the position touched by the user with a pen, a finger, or the like, and a display device are integrally formed, and is formed by overlaying a transparent touch panel 16t on a liquid crystal display screen 16d of 256×64 dots, for example, in the center front of the key input section 14. An input area of the handwriting input section 16 can be switched to an area for inputting handwriting characters (Chinese characters) or for inputting various function buttons, or an area in which such input areas are mixed.

A trail laid down as a handwriting input is made in a state in which the handwriting input section 16 is switched to a handwriting character input area is echoed back and displayed on the liquid crystal display screen.

On the approximately entire surface of the top surface of the lid casing 12, there is provided a touch-panel display section (main screen) 17 of 480×320 dots, for example, with a back light. As in the case of the handwriting input section (sub screen) 16, the touch-panel display section (main screen) 17 has a configuration in which a touch position detection device configured to detect a position touched by the user with a pen, a finger, or the like, and a display device are integrally formed, and is configured by overlaying a transparent touch panel 17*t* over the liquid crystal display screen 17*d*.

At the right end of the touch-panel display section (main screen) 17, there is provided a touch key area 17A, on which key inscriptions are fixedly printed, designed to perform an operation of pressing down some keys in the key input section 14 through a touch operation.

At the left end of the touch-panel display section (main screen), there is provided a touch button area 17B, on which a variety of buttons are displayed, and which is designed to specify a function that can be executed according to the content to be displayed through a touch operation.

For example, when an item (such as a direction word) of a desired dictionary is searched and an content display screen G showing the content (such as descriptive information) of the item is displayed on the touch-panel display section 17, a highlighter button BM and a wordbook button BT are displayed in the touch button area 17B. The highlighter button BM is designed to set a highlighter mode for distinctively displaying an arbitrary range with color highlighters when the range is touched and traced in the content displayed on the content display screen G. The wordbook button BT is designed to call up a wordbook in which user-desired items of a dictionary are uniquely classified by the user.

Figure 2:
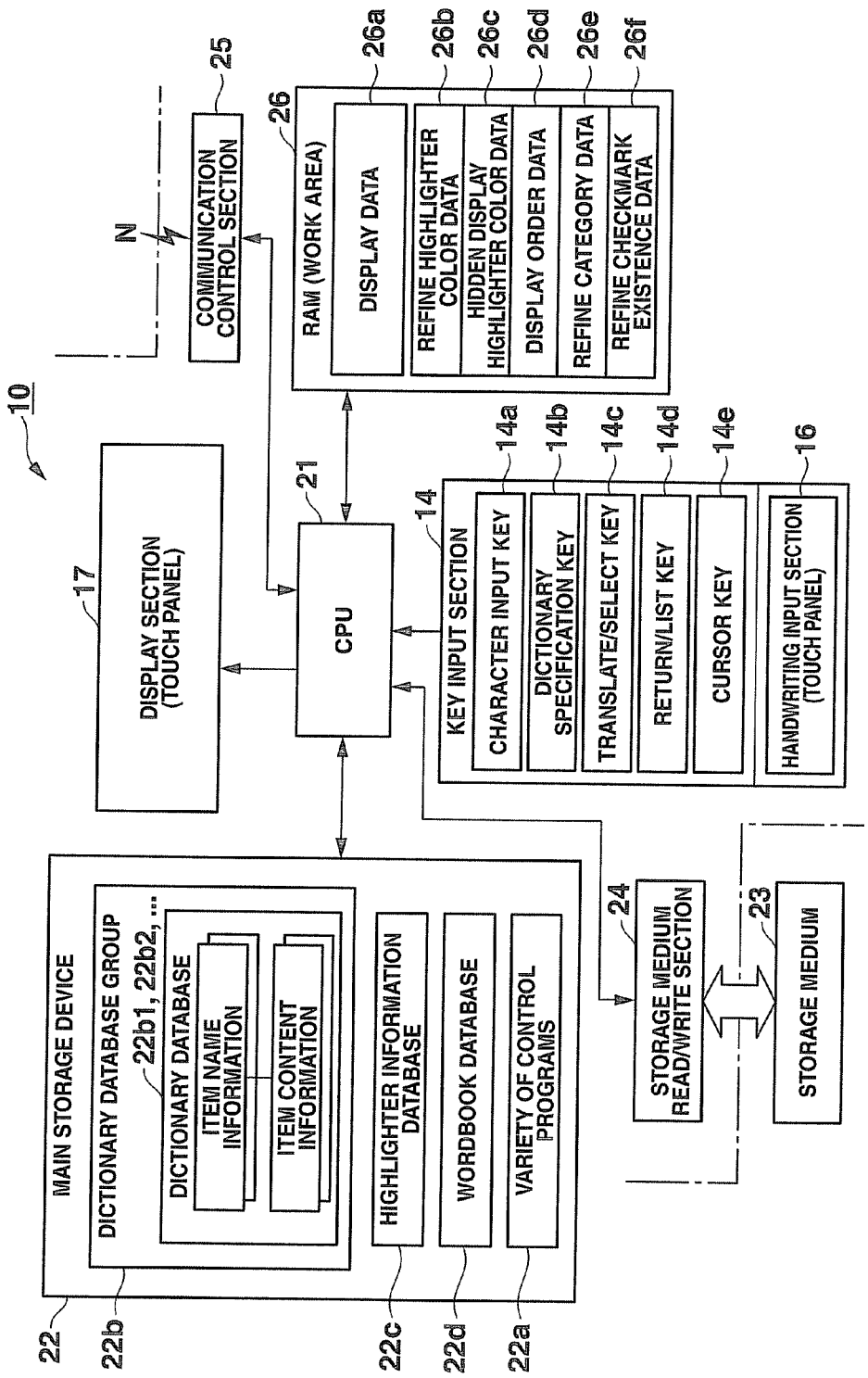
FIG. 2 is a block diagram illustrating a configuration of an electronic circuit of the electronic dictionary device 10.

FIG. 2 is a block diagram illustrating a configuration of an electronic circuit of the electronic dictionary device 10.

The electronic dictionary device 10 is formed of a computer in which a program recorded in a variety of storage mediums or a transmitted program is read and operation is controlled by the read program, and includes an electronic circuit equipped with a central processing unit (CPU) 21.

The CPU 21 controls the operation of each member of the circuit using a RAM 26 as a work memory, according to a device control program stored in advance in the main storage device (such as a flash ROM) 22, a device control program read into the main storage device 22 via a storage medium reading section 24 from an external storage medium 23, such as a ROM card, or a device control program read into the main storage device 22 via a communication control section 25 via a Web server (a program server in this case) on the Internet N.

The device control program stored in the main storage device 22 is activated according to an input signal input according to a user operation from the key input section 14, the handwriting input section 16, and the touch-panel display section 17, a communication signal for communications with a Web server on the Internet N connected via a communication control section 25, and a connection communication signal for connection and communications with a memory card (storage medium) 23 connected to the outside via a storage medium read/write section 24, such as an EEPROM, a RAM, or a ROM.

The main storage device 22, the storage medium read/write section 24, the communication section 25, the RAM 26, the key input section 14, the handwriting input section 16, the touch-panel display section 17, and the like are connected to the CPU 21.

As a device control program stored in the main storage device 22, there exist a system program for managing the overall operation of the electronic dictionary device 10, and a communication program for performing data communications with Web servers on the Internet N and a user personal computer (PC), not shown, via the communication control section 25, for example.

The main storage device 22 stores a variety of control programs 22*a* for controlling general processes, such as an item search process for searching an item (such as a direction word) according to an input of a search character string, a reading display process of information (such as a translation word and its semantic content) of a content corresponding to the searched item, a wordbook registration process of adding a color highlighter to a user-desired range in displayed content information and registering it in a wordbook, and a wordbook call-up process of calling up a registered wordbook and displaying it, based on a dictionary database 22*b*, a highlighter information database 22*c*, and a wordbook database 22*d*.

The dictionary database 22*b* stores a variety of dictionary contents 22*b*1, 22*b*2, . . . stored in advance or after being downloaded.

Each of the dictionary contents includes a plurality of items (such as direction words) and contents of the items (such as descriptive information) stored in association with each other. In the items, example sentences and set phrases, for example, as well as direction words, are shown as examples.

Further, each of the dictionary contents stores data indicating a category to which the dictionary content pertains.

For example, an English-Japanese dictionary 22*b*1 describing Japanese content information (descriptive information) is stored in association with a English item name (direction word), an English-English dictionary 22*b*2 describing English content information (descriptive information) is stored in association with an English item name (direction word), a Japanese dictionary 22*b*3 describing Japanese item information (descriptive information) is stored in association with a Japanese item name, and a Japanese history dictionary 22*b*4 describing content information (descriptive information) is stored in association with a Japanese history item name (direction word).

FIG. 3 illustrates contents of the highlighter information database 22*c* stored in the main storage device 22 of the electronic dictionary device 10.

The highlighter information database 22*c* stores a content name, a kind of the item, a name of the item, and a character position of a highlighter range of a dictionary added with highlighters in a highlighter mode set by the highlighter button BM, in association with one another.

More specifically (FIGS. 7A, 7B, and 7C), on a display screen G of the content information of the item name "やましろのくにいっき (Yamashiro no kuni ikki) [山城の国一揆 (Province-wide revolts of Yamashiro)]" of Japanese History Abridged dictionary, for example, a range h1 of the item name is touched and traced with a magenta highlighter as "important item", and a range h2 of a year in the content information is touched and traced with a blue highlighter as "important year". When they are registered in a wordbook, they are stored as the content name "Japanese History Abridged dictionary", the item kind "direction word", the item name "やましろの くにいっき (Yamashiro no kuni ikki)", the character position in the highlighter range "[magenta: 1-18] [blue: 19-29]".

FIG. 4 illustrates the contents of the wordbook database 22*d* stored in the main storage device 22 of the electronic dictionary device 10.

In the wordbook database 22*d*, the name of the wordbook registered in a wordbook, the content information ([Category] and [Content Name]), the kind of the item, the name of the item, the highlighter existence/nonexistence data indicating existence or nonexistence of a highlighter added for each color in an item and a content thereof, and the checkmark existence/nonexistence data indicating existence or nonexistence of a checkmark to an item, are stored in association with one another.

More specifically (FIGS. 7A, 7B, and 7C), as in the above-described case, on a display screen G of the content information of the item name "やましろの くにいっき (Yamashiro no kuni ikki) （[山城の国一揆 (Province-wide revolts of Yamashiro)])" of the Japanese History Abridged dictionary, for example, when a range h1 of the item name, which is touched and traced with a magenta highlighter as "important item" and a range h2 of the range of the year in the content information, which is touched and traced with a blue highlighter as "important year", are registered in a selected wordbook [Wordbook 1], the wordbook name "Wordbook 1", the content information ([Category: history] [Content name: Japanese History Abridged dictionary]), the item kind [direction word], the item name "やましろの くにいっき (Yamashiro no kuni ikki)", the highlighter existence/nonexistence data ([magenta: existence] [yellow: nonexistence] [blue: existence], and the checkmark existence/nonexistence data [nonexistence], are stored.

Existence or nonexistence of an item checkmark is determined according to whether or not a checkmark "✓" is added to a checkmark box CH provided in association with each of the registered items on the list screen (FIG. 9C) of the registered words called up from a user-desired wordbook.

Besides the display data memory 26a, the refine highlighter color data memory 26b, the hidden display highlighter color data memory 26c, the display order data memory 26d, the refine category data memory 26e, and the refine checkmark existence data memory 26f, the RAM 26 includes a work memory that stores a variety of data, as necessary, to be input and output to and from the CPU 21 according to the control program 22a.

The display data memory 26a includes a storage area for display data corresponding to a display screen of the touch-panel display module 17, and data to be displayed on the display screen is exploded as bitmap pattern data and stored.

The refine highlighter color data memory 26b stores highlighter color data for refining registered words to be called up by the color of the color highlighter, according to the selection operation of the refinement buttons BSa-BSb (FIG. 11) displayed in the touch button area 17B of the touch-panel display module 17, when a user-desired wordbook is called up.

The hidden display highlighter color data memory 26c stores highlighter color data for setting display or non-display of the information added with a color highlighter for each color, according to the operation of selecting the hidden display buttons BK0-BKa (FIG. 13) displayed in the touch button area 17B of the touch-panel display section 17, when the content information corresponding to the item registered in a wordbook is displayed.

The display order data memory 26d stores display order data for setting the alignment order of the items to be displayed on a list screen GT (FIG. 9C) of registered words to the order of registration or to the order of the SJIS code, according to a selection operation of the display order buttons BNt, BNj (FIG. 12) displayed in the touch button area 17B of the touch-panel display section 17, when a user-desired wordbook is called up.

The refine category data memory 26e stores category data for refining registered words to be called up based on the category of the dictionary, according to a selection operation of category selection buttons BQa-BQh (FIG. 14) displayed in the touch button area 17B of the touch-panel display section 17, when a user-desired wordbook is called up.

The refine checkmark existence data memory 26f stores checkmark existence/nonexistence data for refining registered words to be called up based on whether or not the checkmark "✓" exists, according to the selection operation of the refine buttons BSch, BSn (FIG. 11) displayed in the touch button area 17B of the touch-panel display module 17, when a user-desired wordbook is called up.

Next, the color highlighter addition/wordbook registration/call-up function of the electronic dictionary device 10 with the above-described configuration will be described.

(Color Highlighter Addition and Wordbook Registration Function)

FIG. 5 is a flowchart illustrating a color highlighter addition and wordbook registration process of the electronic dictionary device 10.

FIGS. 6A, 6B, 6C, and 6D illustrate concrete examples (1st part) of a display operation involved in the color highlighter addition and the wordbook registration process by the electronic dictionary device 10.

Figure 7A:
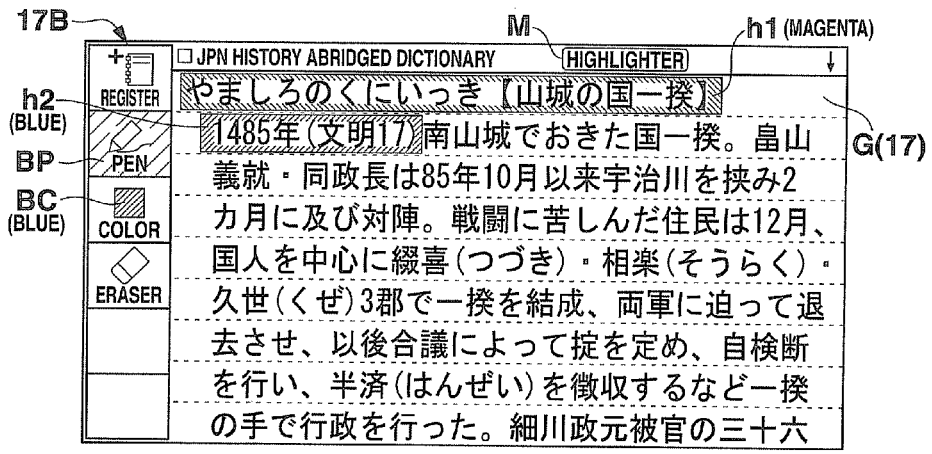
FIGS. 7A, 7B, and 7C illustrate concrete examples (2nd part) of a display operation involved in the color highlighter addition and wordbook registration process by the electronic dictionary device 10.
Figure 7B:
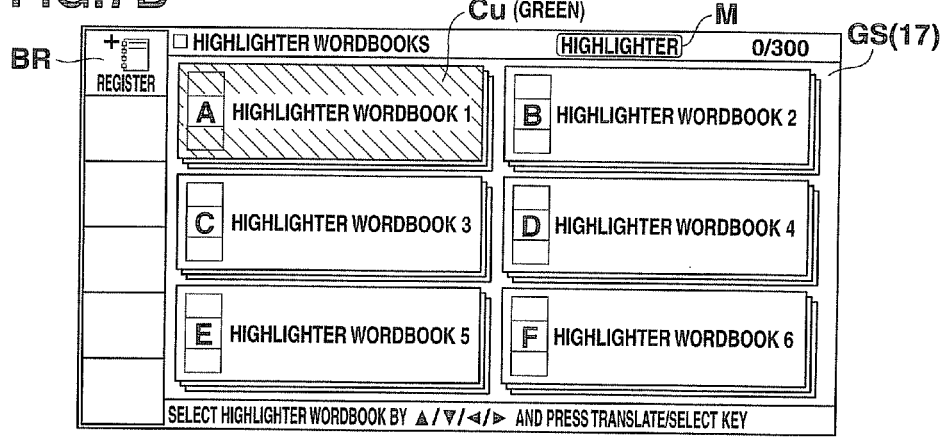
Figure 7C:
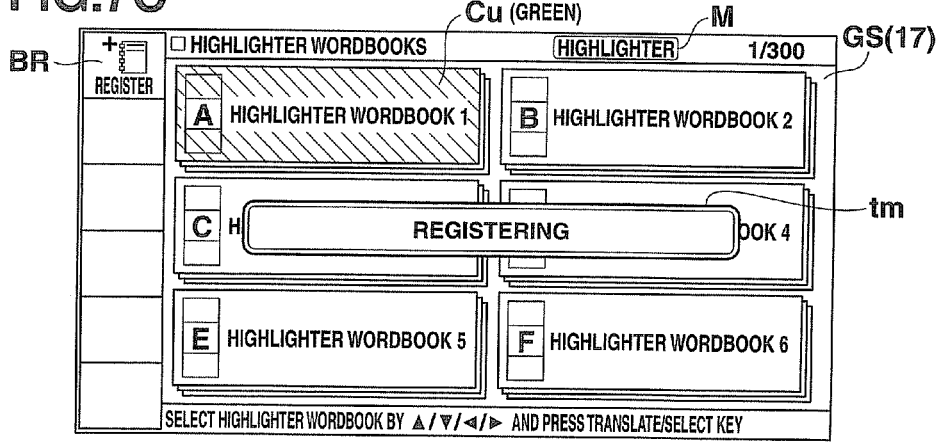

FIGS. 7A, 7B, and 7C illustrate concrete examples (2nd part) of a display operation involved in the color highlighter addition and the wordbook registration process of the electronic dictionary device 10.

Figure 6A:
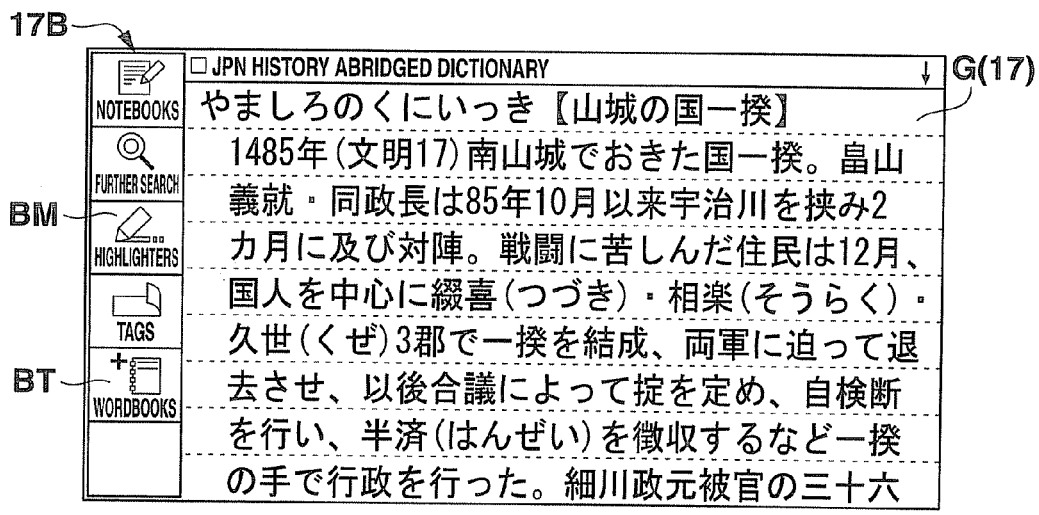
FIGS. 6A, 6B, 6C, and 6D illustrate concrete examples (1st part) of a display operation involved in the color highlighter addition and wordbook registration process by the electronic dictionary device 10.

According to a user operation of a dictionary specification key 14b, Japanese History Abridged dictionary (22b4), for example, is specified, the item (direction word) "やましろの くにいっき (Yamashiro no kuni ikki) （[山城の国一揆 (Province-wide revolts of Yamashiro)])" of the Japanese History Abridged dictionary is searched and "Translate/Select" key 14c is pressed down. Then, as shown in FIG. 6A, the content display screen G of the item "やましろ のくにいっき (Yamashiro no kuni ikki) （[山城の国一揆 ((Province-wide revolts of Yamashiro)])" is displayed on the touch-panel display section 17 (step S1).

In the display state of the content display screen G, a highlighter button BM for setting to a highlighter mode and a wordbook button BT for setting to a wordbook mode are displayed in the touch button area 17B at the left end of the screen.

Figure 6B:
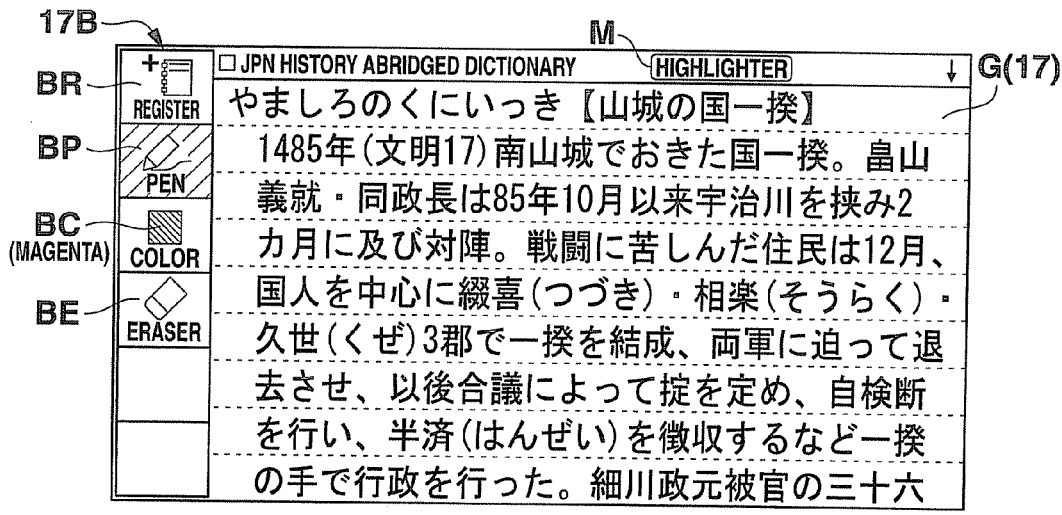

Here, when the highlighter button BM is touched (step S2 [YES]), the highlighter mode is set, and the highlighter mode mark M is displayed at the upper end of the screen, as shown in FIG. 6B (step S3).

In the display state of the content display screen G in which the highlighter mode is set, a registration button BR for instructing registration of an item being displayed in a wordbook, a pen button BP for setting an input state of the highlighter pen, a color specification button BC for specifying the color of the color highlighter in which a pen input is to be made, and an eraser button BE for erasing the input highlighter by specifying it with a pen are displayed in the touch button area 17B at the left end of the screen.

The color specification button BC is set such that the specification color of the color highlighter is sequentially selected from magenta (default), to yellow, to blue, and to magenta, for example, as the button BC is touched.

Figure 6C:
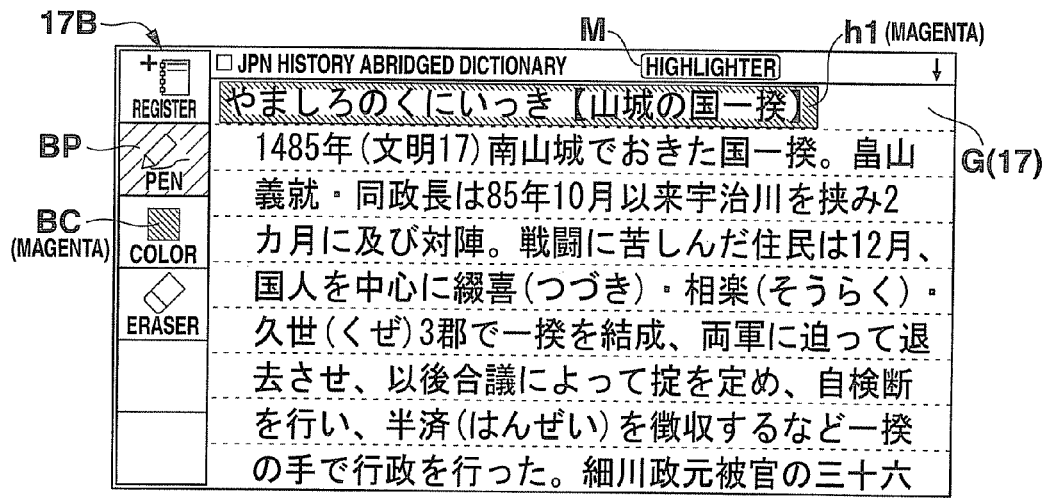

When the item (direction word) "やましろの くにいっき (Yamashiro no kuni ikki) （[山城の国一揆 (Province-wide revolts of Yamashiro)])" being displayed on the content display screen G is touched and traced by a pen, in the state in which the pen button BP of the touch button area 17B is touched and the color specification button BC (magenta) is selected, as shown in FIG. 6C, the color highlighter (magenta) is accordingly displayed in the range h1 of the position of the character touched and traced by the pen (step S4).

Figure 6D:
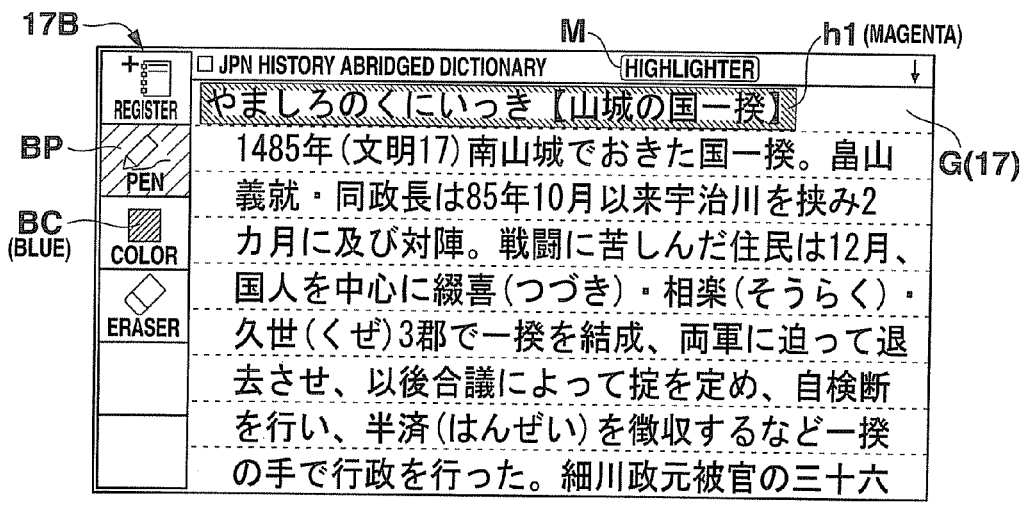

Further, as shown in FIG. 6D, when the year "1485 (Bunmei 17)" being displayed on the content display screen G is touched and traced with a pen, as shown in FIG. 7A, in the state in which the color specification button BC (blue) is selected, the color highlighter (blue) is displayed in the range h2 of the position of the character touched and traced by the pen (step S4).

Here, when the registration button BR is touched (step S5 [YES]), the character positions "1-18" of the range h1 (magenta) and the character positions "19-29" of h2 (blue), in which the color highlighter is displayed in the item being displayed and its content information, are associated with the corresponding content name "Japanese History ABRIDGED dictionary", and the item kind "direction word", the item name "やま しろのく にいっき (Yamashiro no kuni ikki)", and are registered in the highlighter information database 22c (FIG. 3) (step S6).

Then, it is determined whether or not the item being displayed is registered in the wordbook database 22d (FIG. 4) (step S7), and when it is determined that the item being displayed is not registered (step S7 [NO]), a wordbook selection screen GS, on which the wordbooks [1]-[6] as registration candidates are listed, is displayed.

On the wordbook selection screen GS, when [Wordbook 1] is touched and selected, for example, the selected [Wordbook 1] is shown by a cursor Cu (green) (step S8).

Then, as shown in FIG. 7C, a registering message "Registering" tm is displayed on the wordbook selection screen GS, and the item name "やましろの くにいっき (Yamashiro no kuni ikki)" and the data indicating existence the color highlighters (magenta) (blue), which were displayed at the time of touch of the registration button BR, are associated with the selected wordbook name "Wordbook 1", the content information [Category: History] [Content Name: Japanese History Abridged dictionary], the item kind [Direction Word], and registered in the wordbook database 22d (FIG. 4) (step S9).

When it is determined in step S7 that the item being displayed and to be registered has already been registered in the wordbook database 22d (FIG. 4) (step S7 [YES]), only the highlighter existence/nonexistence data that is associated with the item of the registered wordbook exists is updated (step S10).

When the wordbook button BT is touched (step S11 [YES]) on the content display screen G of the user-desired item (step S1) without being set to the highlighter mode (step S2 [NO]), information corresponding to the item displayed at the time of touch of the wordbook button BT is registered in the wordbook database 22d (FIG. 4) (step S12).

In the color highlighter addition and wordbook registration process, the process of registering information on the color highlighter being displayed in the highlighter information database 22c (step S6), and the process of registering information on the item being displayed in the wordbook database 22d (steps S7-S10) are configured to be executed by an operation of touching the registration button BR.

The above-described processes may also be configured as will be described below.

The process of registering information on the color highlighter being displayed in the highlighter information database 22c (step S6) and the process of updating color highlighter information (step S7→S10) when the information on the item being displayed is already registered in the wordbook database 22d are sequentially executed following the process of displaying the color highlighter (step S4), irrelevant of the registration button BR.

Further, the process of registering the item information and the color highlighter information when the information on the item being displayed is not registered in the wordbook database 22d (steps S8, S9) is configured to be executed according to the touch operation of the registration button BR.

(Wordbook Call-Up Function)

Figure 8:
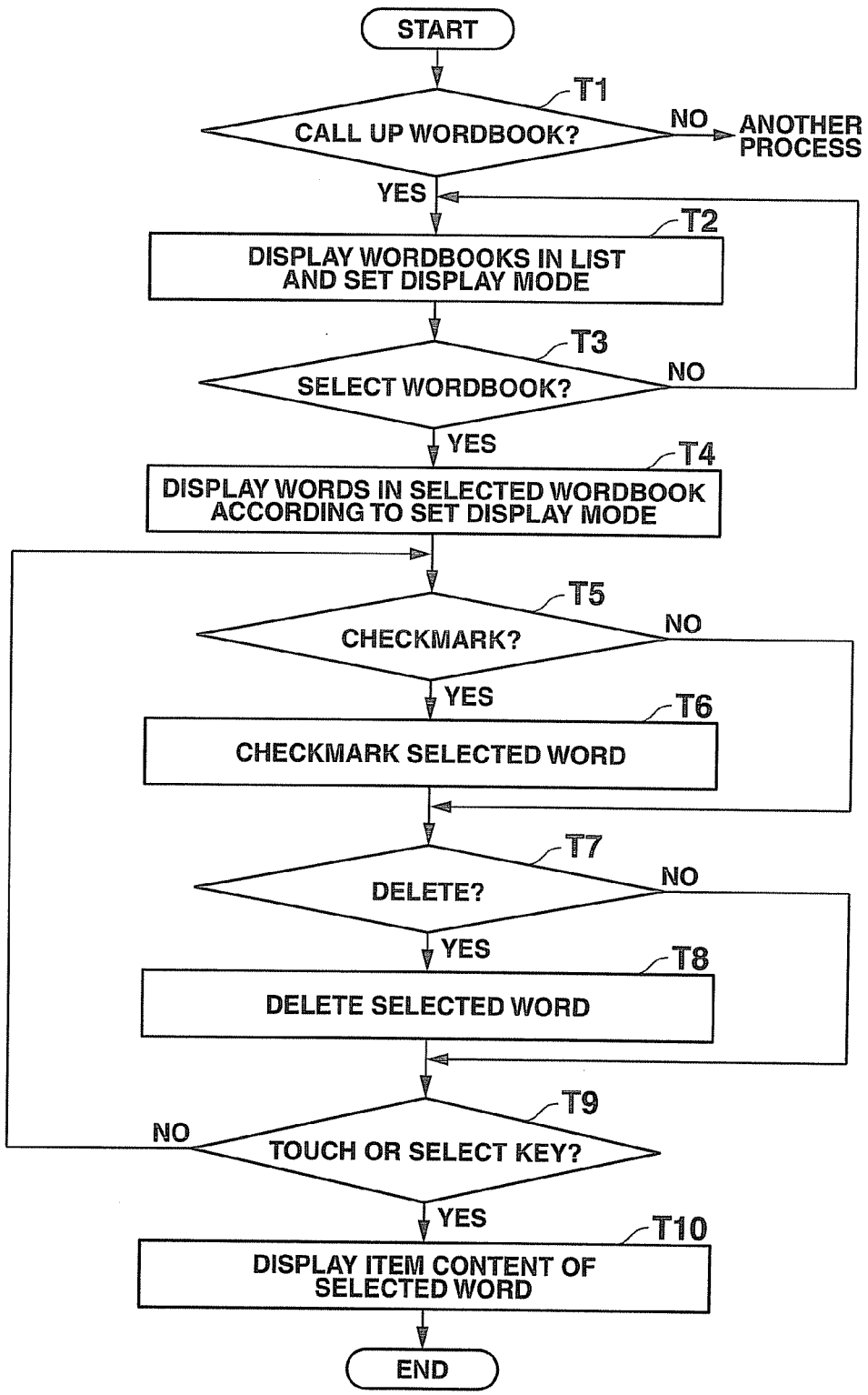
FIG. 8 is a flowchart illustrating a wordbook call-up process by the electronic dictionary device 10.

FIG. 8 is a flowchart illustrating a wordbook call-up process of the electronic dictionary device 10.

FIGS. 9A, 9B, 9C, and 9D illustrate concrete examples (1st part) of a display operation involved in a wordbook call-up process by the electronic dictionary device 10.

Figure 10A:
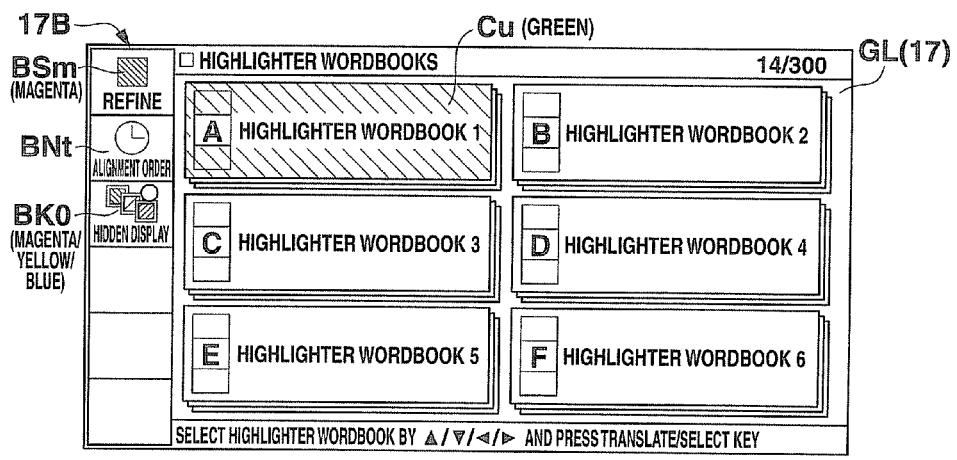
FIGS. 10A and 10B illustrate concrete examples (2nd part) of a display operation involved in the wordbook call-up operation by the electronic dictionary device 10.
Figure 10B:
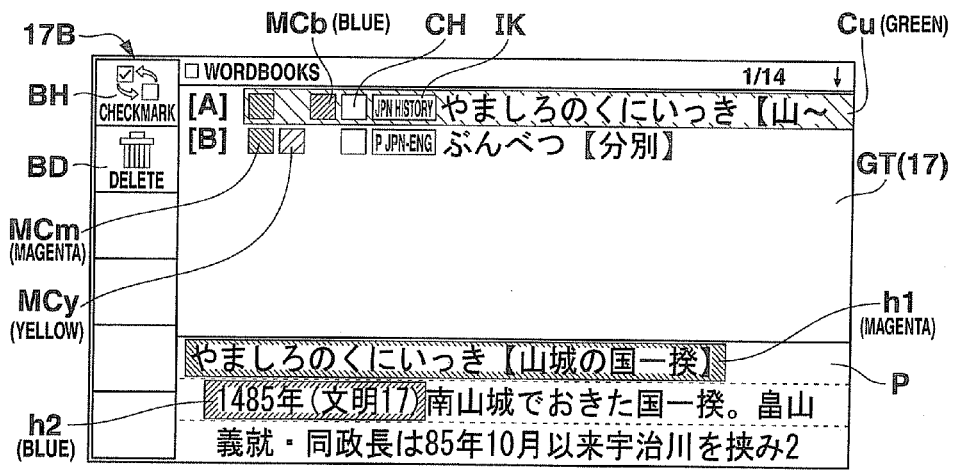

FIGS. 10A and 10B illustrate concrete examples (2nd part) of a display operation involved in the wordbook call-up process by the electronic dictionary device 10.

Figure 9A:
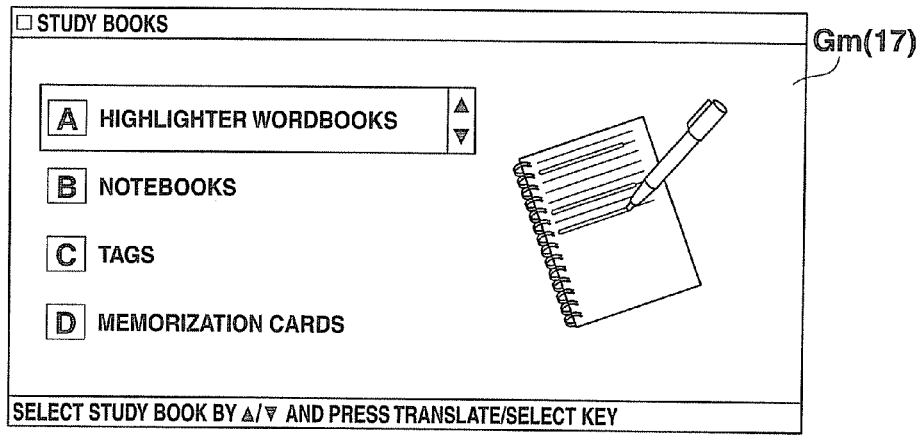
FIGS. 9A, 9B, 9C, and 9D illustrate concrete examples (1st part) of a display operation involved in the wordbook call-up process by the electronic dictionary device 10.
Figure 9B:
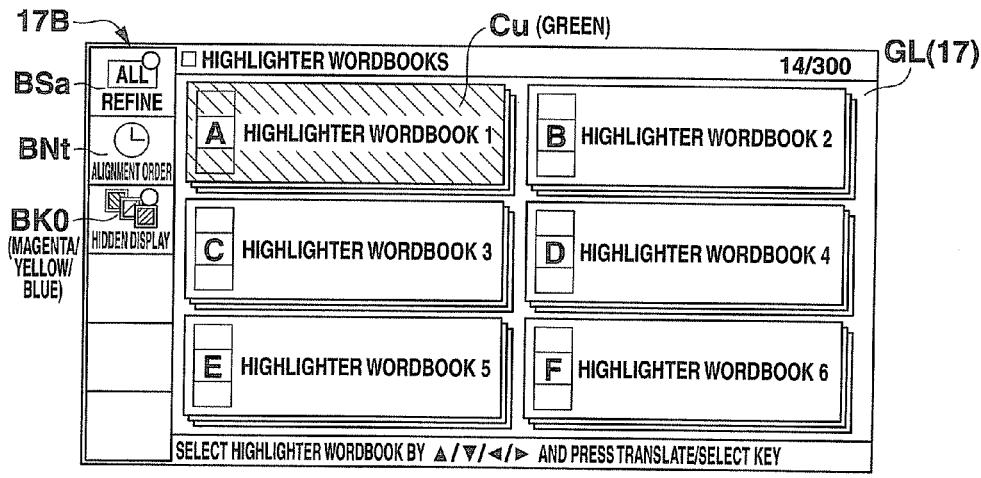

When "[A] Highlighter Wordbook" displayed on a study book menu screen Gm is selected, and the "Translate/Select" key 14c is pressed down (step T1 (YES) while the study book menu screen Gm is displayed on the touch-panel display section 17, as shown in FIG. 9A, in response to a press-down of the "Menu/Study Book" key 14bg of the dictionary specification key 14b, a wordbook list screen GL of call-up candidates is displayed, as shown in FIG. 9B (step T2).

In the display state of the wordbook list screen GL, a refine button BS (BSa: non-refinement by default) for refining the registered words to be called up according to the color of the color highlighter and the checkmark existence/nonexistence data, a display order button BN (BNt: registration order by default) for setting the order of alignment of the called-up registered words (items), and a hidden display button BK (BK0 in default: non-hide) for setting display/no-display of information added with a color highlighter for each color of the highlighter are displayed.

Figure 11:
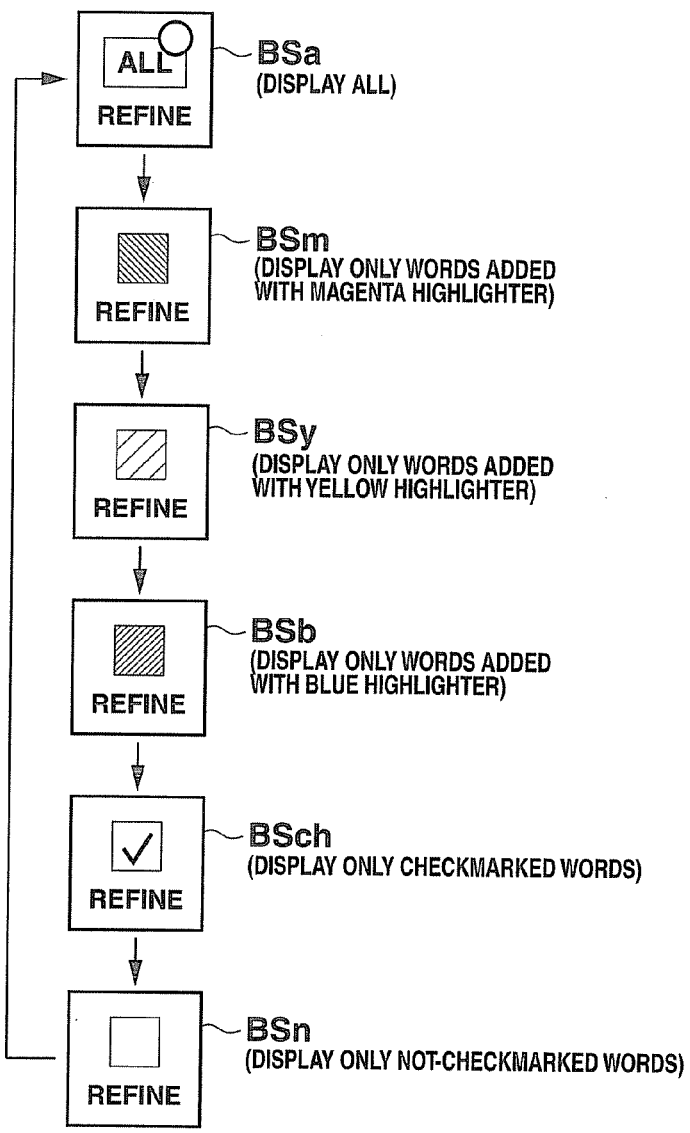
FIG. 11 illustrates the switching order of refine buttons BSa-BSn displayed in a touch button area 17B together with a wordbook list screen GL, involved in the wordbook call-up process of the electronic dictionary device 10.

FIG. 11 illustrates the switching order of the refine buttons BSa-BSn displayed in the touch button area 17B together with the wordbook list screen GL involved in the wordbook call-up process of the electronic dictionary device 10.

In the touch button area 17B on the wordbook list screen GL, a refine button BSa (non-refinement) is displayed by default, and every time the button is touched, the refine button switches from BSa to BSm (refine to registered words added with magenta color highlighter) to BSy (refine to registered words added with yellow color highlighter) to BSb (refine to registered words added with blue color highlighters) to BSch (refine to registered words with item checkmarks) to BSn (refine to registered words without item checkmarks) to BSa.

Figure 12:
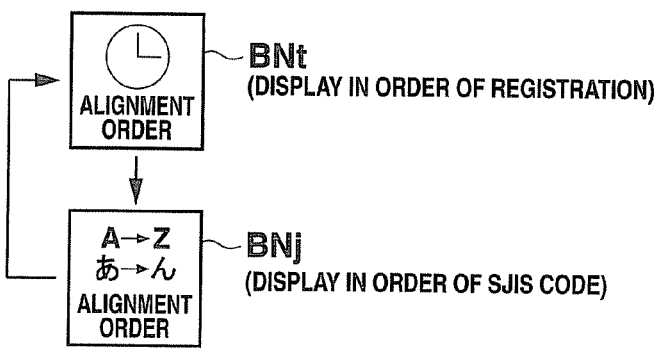
FIG. 12 illustrates the switching order of display order buttons BNt, BNj displayed in the touch button area 17B together with the wordbook list screen GL, involved in the wordbook call-up process of the electronic dictionary device 10.

FIG. 12 illustrates the switching order of the display order buttons BNt, BNj displayed in the touch button area 17B, together with the wordbook list screen GL, involved in the wordbook call-up process of the electronic dictionary device 10.

In the touch button area 17B on the wordbook list screen GL, the display order button BNt (displayed in the order of registration) is displayed by default, and switching is made from BNt to BSj (displayed in the order of the SJIS code) to BNt, every time the touch operation is performed on the button.

Figure 13:
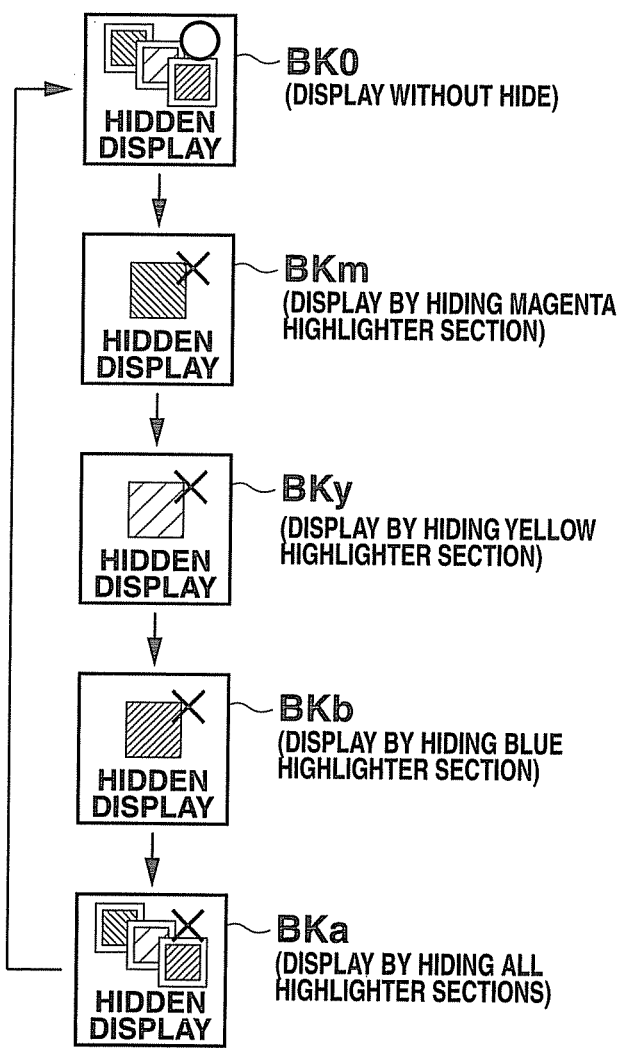
FIG. 13 illustrates the switching order of hidden display buttons BK0-BKa displayed in the touch button area 17B together with the wordbook list screen GL, involved in the wordbook call-up process of the electronic dictionary device 10.

FIG. 13 illustrates the order of switching of the hidden display buttons BK0-BKa displayed in the touch button area 17B, together with the wordbook list screen GL, involved in the wordbook call-up process of the electronic dictionary device 10.

In the touch button area 17B on the wordbook list screen GL, a display button BK0 (non-hide) is displayed by default, and every time a touch operation is performed on the button, switching is made from BK0 to BKm (hidden display of the magenta highlighter section) to BKy (hidden display of the yellow highlighter section) to BKb (hidden display of the blue highlighter section) to BKa (hidden display of all the highlighter sections) to BK0.

When a display mode including the refine button BSa (non-refinement), the display order button BNt (registration order), hidden display button BK0 (non-hide) is set on the wordbook list screen GL shown in FIG. 9B, and [Wordbook 1] is touched and selected while the set data of the display mode is stored in the refine highlighter color data memory 26b, the display order data memory 26d, and the hidden display highlighter color data memory 26c (step T2), the selected [Wordbook 1] is shown by a cursor Cu (green) (step T3).

Then, the information registered in the wordbook database 22d (FIG. 4) in association with the selected [Wordbook 1] is read, and the read item names are associated with the color marks MCm, MCy, MCb set according to the highlighter existence/nonexistence data, a checkmark box CH set according to the checkmark existence/nonexistence data, and a content name IK, and displayed on the touch-panel display section 17 as a registered wordlist screen GT.

Figure 9C:
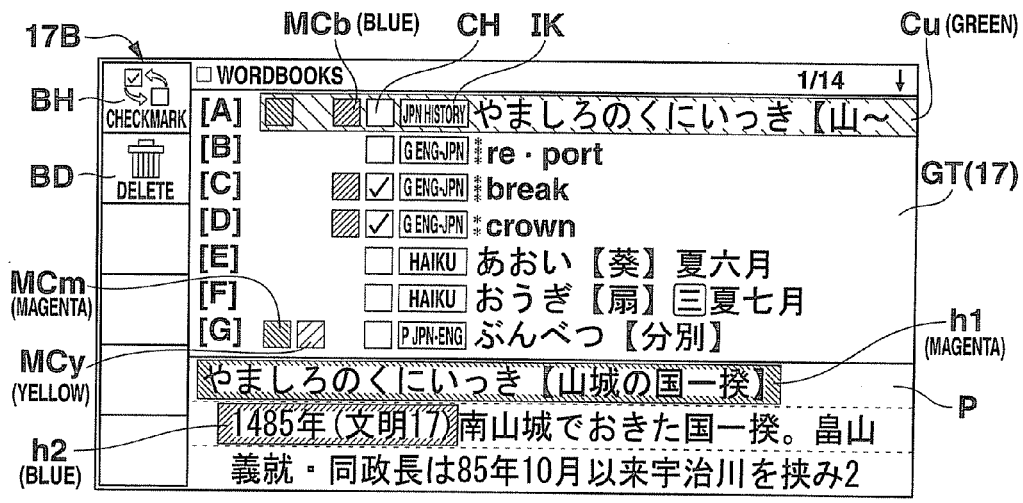

Since the color marks MCm, MCy, MCb, which are associated with the item names as registered words and from which whether or not the section added with a color highlighter is included the item and its content can be determined for each color, are displayed on the registered wordlist screen GT, the user can understand at a glimpse that the head item name "やましろ のくにいっき (Yamashiro no kuni ikki) [Province-side revolts of Yamashiro]" shown in FIG. 9C is marked with a magenta color highlighter as an important item, and that the content of the item includes an important year marked with a blue color highlighter.

On the registered wordlist screen GT, the cursor Cu (green) for selecting an item is displayed, in which the head of the items in the list screen GT is set as a default position, and the name of the item and a section of its content shown by the cursor Cu are displayed as a preview on a preview area P.

In the display state of the registered wordlist screen GT, a checkmark button BH for adding and deleting the checkmark "✓" to and from the checkmark box CH of the item selected by the cursor Cu, and a deletion button BD for deleting the word registration of the item selected by the cursor Cu, are displayed in the touch button area 17B at the left end of the screen.

That is, when the cursor Cu is moved to the position of an arbitrary item on the registered wordlist screen GT and the checkmark button BH is touched, the checkmark "✓" is added or removed to or from the checkmark box CH corresponding to the item selected by the checkmark box, and corresponding checkmark existence/nonexistence data is registered in the wordbook database 22d (step T5→T6).

Further, when the cursor Cu is moved to the position of an arbitrary item on the registered wordlist screen GT and the deletion button BD is touched, word registration of the item selected by the cursor Cu is deleted from the wordbook database 22d (step T7→step T8).

Figure 9D:
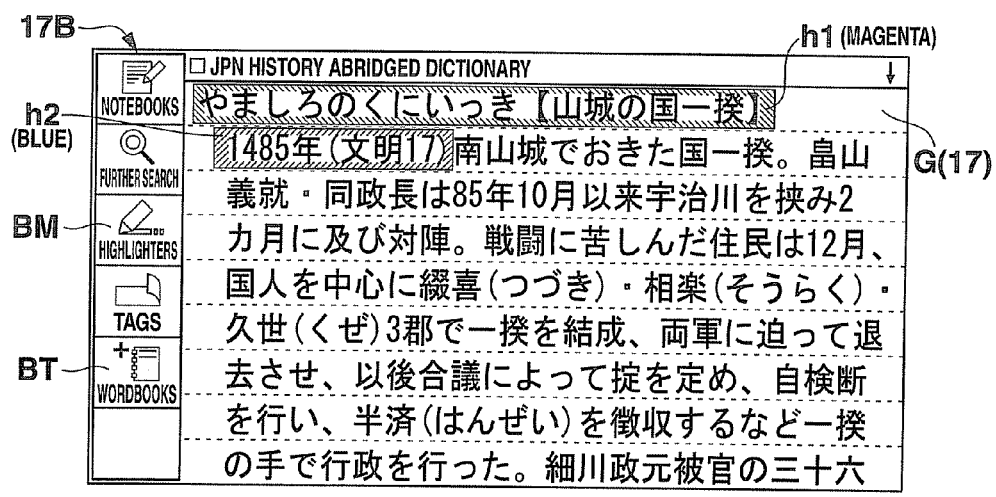

Further, as shown in FIG. 9C, when the selection position of the cursor Cu is touched, or when the "Translate/Select" key 14c is pressed down (step T9. [YES]) while an arbitrary item name "Yamashiro no kuni ikki [[山城の国一揆 (Province-wide revolts of Yamashiro)]]" of the registered wordlist screen GT is selected by the cursor Cu, the item name "Yamashiro no kuni ikki [[山城の国一揆 (Province-wide revolts of Yamashiro)]]" of the selection position and its content are read from the Japanese History Abridged dictionary 22b4, and are displayed on the touch-panel display section 17 as a content display screen G, as shown in FIG. 9D (step T10).

In this case, since the setting data of the display mode in the step T2 is set according to the refine button BSa (non-refinement) and the hidden display button BK0 (non-hide), refinement according to the color of the color highlighter or hidden display (non-display) of its content will not be performed.

Accordingly, on the display screen G of the selected item name "Yamashiro no kuni ikki [[山城の国一揆 (Province-wide revolts of Yamashiro)]]" and its content, the range h1 of the item name "Yamashiro no kuni ikki [[山城の国一揆 (Province-wide revolts of Yamashiro)]]" is marked with a magenta color highlighter and the range h2 of the year "1485 (Bunmei 17)" is marked with a blue color highlighter, according to the character position information (magenta "1-18") (blue "19-29") of the highlighter registered in the highlighter information database 22c.

As shown in FIG. 10A, in the state in which the wordbook list screen GL of call-up candidates is displayed on the touch-panel display section 17 (step T1→T2), the refine button BSm (magenta), the display order button BNt (registration order), and the hidden display button BK0 (non-hide) in the touch button area 17B are selected to set the display mode (step T2), and [Wordbook 1] is selected and the cursor Cu (green) is displayed (step T3).

Then, only the item names corresponding to the data with the color highlighter (magenta) included in the information registered in the wordbook database 22d (FIG. 4) in association with the selected [Wordbook 1] are read in the order of registration. As shown in FIG. 10B, these item names are associated with the color marks MCm, MCy, MCb set according to the highlighter checkmark existence/nonexistence data, the checkmark box CH set according to the checkmark existence/nonexistence data, and the content name IK (step T4).

Thereby, only the item name marked with, e.g., a magenta color highlighter as an important item by the user is read, and displayed in a list on the registered wordlist screen GT.

Further, as shown in FIG. 10B, when the selection position of the cursor Cu is touched, or when the "Translate/Select" key 14c is pressed down (step T9 [YES]) while an arbitrary item name "Yamashiro no kuni ikki [[山城の国一揆 (Province-wide revolts of Yamashiro)]]" of the registered wordlist screen GT is selected by the cursor Cu, the item name "Yamashiro no kuni ikki [[山城の国一揆 (Province-wide revolts of Yamashiro)]]" of the selection position and its content are read from the Japanese History Abridged dictionary 22b4, and are displayed on the touch-panel display section 17 as a content display screen G added with the color highlighters h1 (magenta) and h2 (blue) as in the case shown in FIG. 9D (step T10).

In this case, since the setting data of the display mode in the step T2 is set according to the hidden display button BK0 (non-hide), hidden display (no display) of the contents in the ranges h1 and h2 added with the color highlighters is not performed.

Other Embodiments

In the wordbook call-up process, display of the wordbook list screen GL that displays wordbooks of call-up candidates in a list is configured such that one of the refine buttons BSa, BSm, BSy, and BSb set for a color of the color highlighter and the refine buttons BSch, BSn for existence/nonexistence of the item checkmark is selectively displayed in the touch button area 17B, as shown in FIG. 11, and the registered words included in the [Wordbook n] to be called up are refined to words added with a desired color highlighter or words having an item checkmark or not having an item checkmark, and are displayed as a list on the registered wordlist screen GT (FIGS. 10A and 10B, for example).

Figure 14:
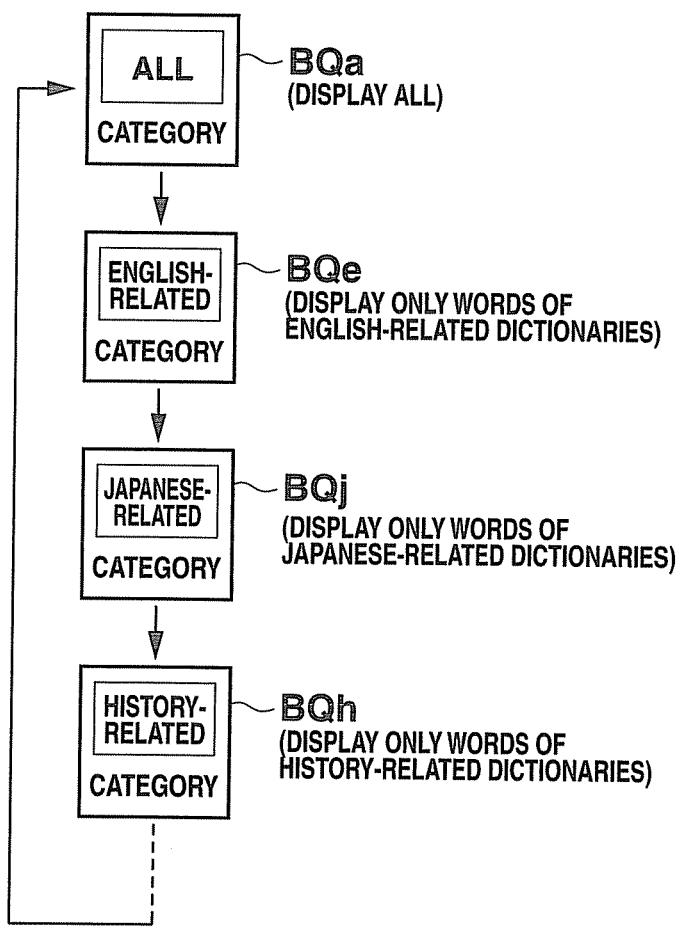
FIG. 14 illustrates the switching order of category refine buttons BQa-BQh displayed in the touch button area 17B together with a wordbook list screen GL, involved in the wordbook call-up process of the electronic dictionary device 10.

In displaying the wordbook list screen GL, the category refine buttons BQa-BQh may be selectively displayed, as shown in FIG. 14, and the list screen GT may be displayed by making a further refinement according to the category of the registered words, in addition to the color of the color highlighter and existence/nonexistence of the item checkmark.

FIG. 14 illustrates the switching order of the category refinement buttons BQa-BQh displayed in the touch button area 17B, together with the wordbook list screen GL involved in the wordbook call-up process of the electronic dictionary device 10.

That is, a category refine button BQa (no category refine) is displayed by default in the touch button area 17B on the wordbook list screen GL, and every time a touch operation is performed on the button, refinement is performed according to the category, such that switching is made from BQa→BQe (refine to registered words of English-related contents)→BQj (refine to registered words of Japanese-related contents)→BQj (refine to registered words of history-related contents)→ ... →BQa.

In the refine buttons BSa-BSn (FIG. 11) of the color highlighter and the item checkmark, the kind to be refined is switched one by one from 6 kinds, but more than one overlapping kinds may be selected. For example, a registered wordlist screen GT refined to only the registered words including both magenta and blue color highlighters may be displayed.

Further, although not shown, refinement of registered words to be displayed on the registered wordlist screen GT may be performed according to the content name of the item kind associated with each of the registered word of the wordbook database 22d.

Moreover, the refinement buttons BSa-BSn, the display order buttons BNt, BNj, hidden display buttons BK0-BKa, the category refine buttons BQa-BQh, and the like may be configured to be displayed in the touch button area 17B in the state in which a user-desired [Wordbook n] is selected and the list screen GT of registered words is displayed.

According to the above-described configuration, it is possible to increase or decrease the degree of refinement while confirming the registered words actually displayed as a list on the list screen GT of the registered words.

(Modification Example of Registered Wordlist Screen GT)

Figure 15A:
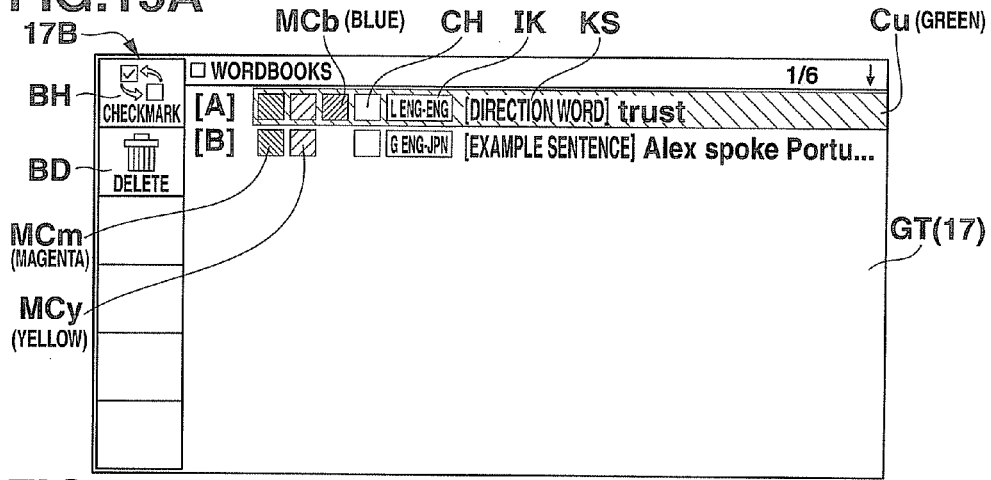
FIGS. 15A, 15B, and 15C illustrate a modified example of the registered wordlist screen GT which is displayed being involved with the wordbook call-up process of the electronic dictionary device 10.
Figure 15B:
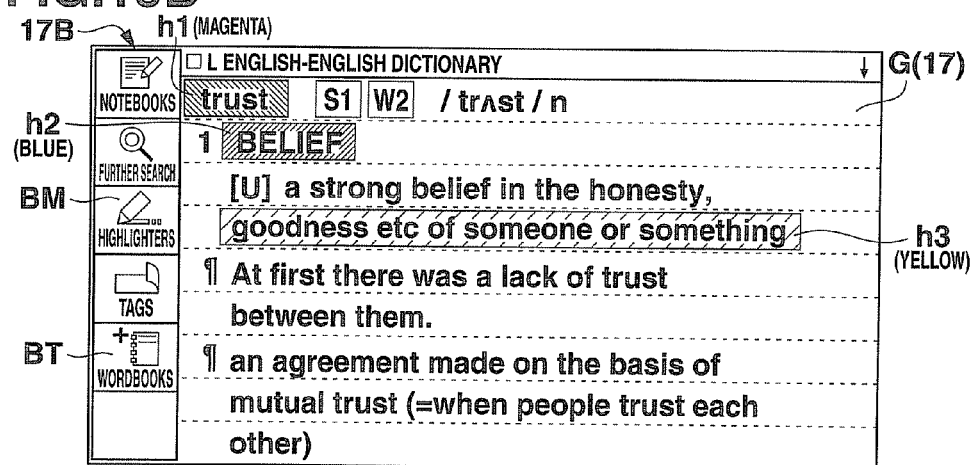
Figure 15C:
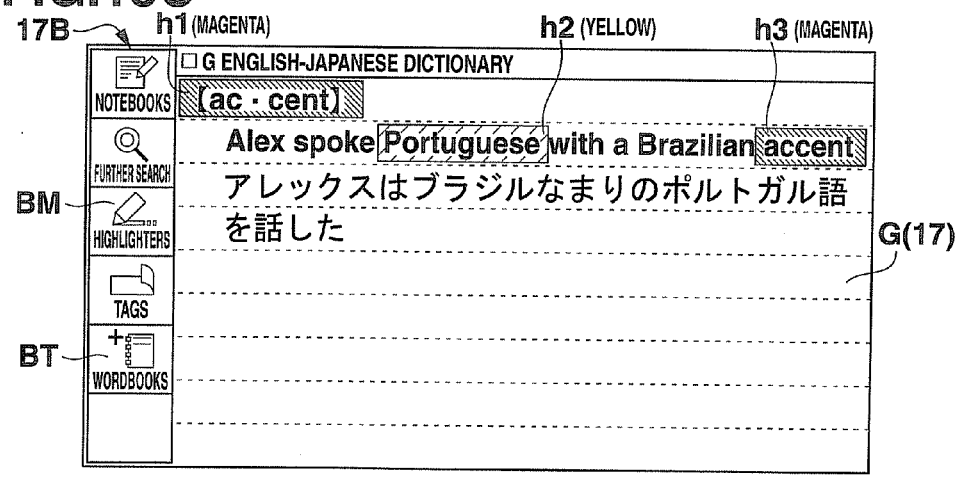

FIGS. 15A, 15B, and 15C illustrate modification examples of the registered wordlist screen GT that is displayed being involved with the wordbook call-up, process of the electronic dictionary device 10.

On the registered wordlist screen GT (FIGS. 9C and 10B) described in the above-described embodiment, the name of each of the items read as registered words of a [Wordbook n] selected by the user is configured to be displayed by being associated with the color marks MCm, MCy, MCb set according to the highlighter existence/nonexistence data, the checkmark box CH set according to the checkmark existence/nonexistence data, and the content name IK.

As shown in FIG. 15A, an item kind KS may be further added, in addition to the color marks MCm, MCy, MCb, the checkmark box CH, and the content name IK, as information associated with the item names read as registered words on the registered wordlist screen GT.

The registered wordlist screen GT shown in FIG. 15 selects a [Wordbook 2] of the wordbook database 22d in FIG. 4 (steps T1-T3), and shows the state in which the item names "trust" "Alex spoke Portuguese . . . " as its registered words are associated with the color marks MCm, MCy, MCb, the checkmark box CH, the content name IK, and the item kind KS (step T4).

Further, when the selection position of the cursor Cu is touched, or when the "Translate/Select" key 14c is pressed down (step T9 [YES]) while the item name (direction word) "trust" is selected, the item name (direction word) "trust" of the selection position and its content are read from the L English-English Dictionary 22b2, and is displayed on the touch-panel display section 17 as a content display screen G, as shown in FIG. 15B.

In this case, on the display screen G of the selected item name (direction word) "trust" and its content, the range h1 of the item name (direction word) "trust" is marked with a magenta color highlighter and the range h2 of the important word "BELIEF" at the head of the content is marked with a blue color highlighter, and the range h3 of the descriptive sentence "goodness etc of someone or something" is marked with a yellow color highlighter, according to the character position information (magenta "1-6") (yellow "59-94") (blue "18-23") of the highlighters registered in the highlighter information database 22c (FIG. 3).

Further, when the selection position of the cursor Cu is touched, or when the "Translate/Select" key 14c is pressed down (step T9 [YES]) while the subsequent item name (example sentence) "Alex spoke Portuguese . . . " in the registered wordlist screen GT is selected, the target word "accent" in the item name (example sentence) "Alex spoke Portuguese . . . " of the selection position and its content are read from the G English-Japanese Dictionary 22b1, and is displayed on the touch-panel display section 17 as a content display screen G, as shown in FIG. 15C.

In this case, on the display screen G of the target word "accent" in the selected item name (example sentence) "Alex spoke Portuguese . . . " and its content, the ranges h1, h3 of the word "accent" are marked with a magenta color highlighter and the range h2 of the word "Portuguese" to be noted is marked with a yellow color highlighter, according to the character position information of the highlighters registered in the highlighter information database 22c (FIG. 3).

Embodiment of Hidden Display

Figure 16A:
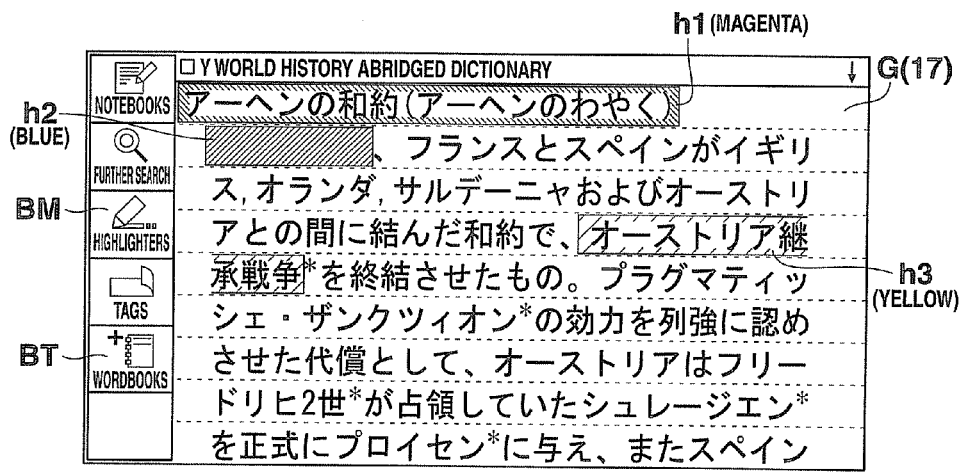
FIGS. 16A and 16B illustrate a content display screen G in comparison in the cases where a hidden display button BKb (blue) is selected and BK0 (non-hide) is selected on the wordbook list screen GL, involved in the wordbook call-up process of the electronic dictionary device 10.
Figure 16B:
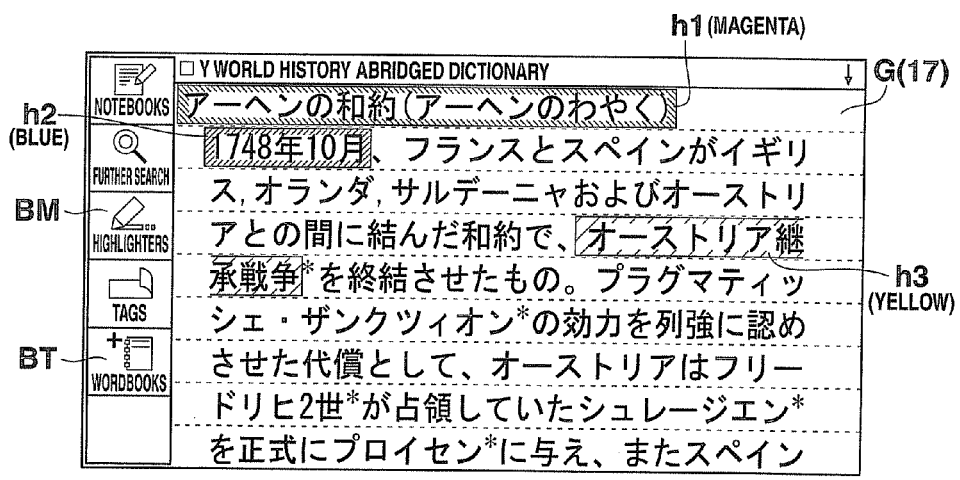

FIGS. 16A and 16B are comparative diagrams illustrating the case where the hidden display button BKb (blue) is selected on the wordbook list screen GL in the wordbook call-up process of the electronic dictionary device 10 and the case where BK0 (non-hide) is selected.

For example, the display mode is set by selecting the hidden display button BKb (blue) (step T1→T2) and [Wordbook 3] is selected (step T3) in the touch button area 17B of the wordbook list screen GL in FIG. 9B.

Then, based on the wordbook database 22d (FIG. 4), the item name "direction word" "アーヘンの和約 (Treaty of Aix-la-Chapelle)" registered in the selected [Wordbook 3] is associated with the color marks MCm, MCy, MCb set according to the highlighter checkmark existence/nonexistence data (magenta: existence) (yellow: existence) (blue: existence), the checkmark box CH set according to the checkmark existence/nonexistence data, and the content name "World History Abridged dictionary", and displayed as the registered wordlist screen GT (step T4).

Further, when the item name (direction word) "アーヘンの和約 (Treaty of Aix-la-Chapelle)" of the registered wordlist screen GT is selected by the cursor Cu and the "Translate/Select" key 14c is pressed down (step T9 [YES]), only the content display screen G is displayed (step T10) in the state in which the content in the range h2 marked with a blue color highlighter as an important year by the user at the time of wordbook registration is hidden as no display, as shown in FIG. 16A, according to the set data of the display mode in which the hidden display button BKb (blue) is selected.

In the touch button area 17B of the wordbook list screen GL in FIG. 9B, the hidden display button BK0 (non-hide) is selected, the display mode is set (step T1→T2), and [Wordbook 3] is selected (step T3).

Further, the item name (direction word) "アーヘンの和約 (Treaty of Aix-la-Chapelle)" of the registered wordlist screen GT of the selected [Wordbook 3] is selected by the cursor Cu, and "Translate/Select" key 14c is pressed down (step T9 [YES]).

Then, according to the set data of the display mode in which the hidden display button BK0 (non-hide) is selected, as shown in FIG. 16B, the content display screen G is displayed, without hiding the content in the range h1 marked with a magenta color highlighter as an important item, the content in the range h2 marked with a blue color highlighter as an important year, or the item of the range h3 marked with a yellow color highlighter as an important event by the user at the time of wordbook registration (step T10).

Accordingly, in that case, the content display screen G, from which the important year in the blue color highlighter section is hidden, can be displayed by selecting the hidden display button BKb (blue) in advance, and it is possible to easily confirm whether or not the important year has been memorized.

Accordingly, according to the color highlighter addition and wordbook registration/call-up function of the electronic dictionary device 10 with the above-described configuration, on the content display screen G corresponding to the searched item of an arbitrary dictionary, an important item is marked with a magenta color highlighter, an important year is marked with a blue color highlighter, and an important event is marked with a yellow color highlighter, for example, and the items are registered in a wordbook. Then, the position information for each color in the range marked with color highlighters in the searched item of the dictionary is registered in the highlighter information database 22c, and the item name of the dictionary is associated with the highlighter existence/nonexistence data, the checkmark existence/nonexistence data, and the content name, and are registered in the wordbook database 22d of the [Wordbook n] selected by the user.

Further, when an arbitrary [Wordbook n] registered in the wordbook database 22d is selected and called up, the item name registered in the selected wordbook is associated with the color marks MCm (magenta), MCy (yellow), MCb (blue) set according to the highlighter existence/nonexistence data, the checkmark box CH set according to the checkmark existence/nonexistence data, and the content name, and are displayed on the registered wordlist screen GT.

It is therefore possible to easily confirm whether an important item added with a magenta color highlighter is included in the item and its content, whether an important year added with a blue color highlighter, and whether an important event added with a yellow color highlighter, just by looking at which of the color marks MCm (magenta), MCy (yellow), and MCb (blue) is associated with each of the item names displayed in a list on the registered wordlist screen GT, and to easily select a desired item and display its content on the display screen G.

Further, according to the color highlighter addition and wordbook registration/call-up function of the electronic dictionary device 10 with the above-described configuration, it is possible to call up an arbitrary [Wordbook n] registered in the wordbook database 22d, and to refine the item names to be displayed in a list on the registered wordlist screen GT, based on the color highlighter existence data of each of the item names registered in the wordbook database 22d, by performing the operation of selecting the refine buttons Bsa (all colors), BSm (magenta), BSy (yellow), BSb (blue) for specifying the color of the color highlighters in displaying the registered wordlist screen GT.

Further, according to the color highlighter addition and wordbook registration/call-up function of the electronic dictionary device 10 with the above-described configuration, when one of the item names displayed in a list on the registered wordlist screen GT is selected and its content display screen G is displayed, the content display screen G can be displayed without displaying the content of the section added with a desired color highlighter based on the position information for each color of the color highlighter range in the item of the dictionary registered in the highlighter information database 22c, by performing an operation of selecting the hidden display buttons BK0 (all colors displayed), BKm (magenta not displayed), BKy (yellow not displayed), BKb (blue not displayed), and BKa (all colors not displayed) for displaying the content display screen G by hiding the content of the highlighter section for each color of the color highlighter.

Further, according to the color highlighter addition and wordbook registration/call-up function of the electronic dictionary device 10 with the above-described configuration, when the checkmark button BH is touched in the state in which the wordbook list screen GL is displayed, the checkmark "✓" is added or removed to or from the checkmark box CH of the item name selected by the cursor Cu on the list screen GT, and checkmark existence/nonexistence data corresponding to the item name the wordbook database 22d is updated. Then, an arbitrary [Wordbook n] registered in the wordbook database 22d is selected and called up. When the registered wordlist screen GT is displayed, it is possible to refine the item names to be displayed in a list as the registered wordlist screen GT, by selecting the refine buttons BSch (existence of an item checkmark), BSn (nonexistence of an item checkmark) specifying whether or not the item checkmark exists, based on the checkmark existence/nonexistence data of a checkmark of each of the item names registered in the wordbook database 22d.

Further, according to the color highlighter addition and wordbook registration/call-up function of the electronic dictionary device 10 with the above-described configuration, the item name to be registered in the wordbook database 22d is registered by being associated with category data of its content. Further, an arbitrary [Wordbook n] registered in the wordbook database 22d is selected and called up. When the registered wordlist screen GT is displayed, it is possible to refine the item names to be displayed in a list on the registered wordlist screen GT, by selecting the category refine buttons BQa (all-category display), BQe (English-related display), BQj (Japanese-related display), BQh (history-related display) specifying the category, based on the category data of each of the item names registered in the wordbook database 22d.

Further, when the registered wordlist screen GT is displayed, it is possible to minutely refine the item name to be displayed in a list on the registered wordlist screen GT, by selecting BSa (all colors), BSm (magenta), BSy (yellow), BSb (blue), selecting BSch (existence of an item checkmark), BSn (nonexistence of an item checkmark) for defining existence/nonexistence of the item checkmark, and selecting the category refine buttons BQa (all category displayed), BQe (English-related display), BQj (Japanese-related display), and BQh (History-related display) for specifying the category.

The above-described approaches and databases of each of the processes of the electronic dictionary device 10, that is, the color highlighter addition and wordbook registration process shown in the flowchart of FIG. 5, the approaches such as the wordbook call-up process shown in the flowchart of FIG. 8, and the dictionary database 22b can be stored in the external storage medium 23 such as a memory card (a ROM card, a RAM card, or the like), a magnetic disc (a floppy disk, a hard disk, or the like), an optical disc (a CD-ROM, a DVD, or the like), or a semiconductor memory, as a program capable of causing a computer to execute. Further, the computer is capable of reading the program stored in the external storage medium 23 into a storage device 22, embodying the color highlighter addition and wordbook registration/call-up function in dictionary information described in the above-described embodiment by controlling the operation by the read program, and executing the similar process according to the above-described approach.

Further, the data of the program for embodying the above-described approaches can be transmitted over the network N as a program code format, and by fetching the program data into the computer connected to the network N by the communication control section 25, it is also possible to embody the color highlighter addition and wordbook registration/call-up function in the above-described dictionary information.

The present invention is not limited to the above-described embodiments, and may be embodied with various modifications within the scope of the invention. Further, the embodiments include various stages of the invention, and various inventions can be extracted by appropriately combining the structural elements disclosed herein. For example, if some of the constituent elements are deleted from all of the constituent elements disclosed in the embodiments, or some of the constituent elements are combined into a different embodiment, the configuration obtained by deleting or combining the constituent elements may be extracted as an invention, as long as the problem is solved thereby and the advantageous effect can be obtained therefrom.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus with a dictionary function, comprising:
   a display device capable of providing colored display;
   a storage including a dictionary storage section that stores a plurality of dictionaries each having a kind and a plurality of items, the items having associated contents;
   a memory; and
   a processor that performs:
      displaying, on the display device, a first arbitrary item of a dictionary, of the plurality of dictionaries stored by the dictionary storage section, the dictionary having a kind specified by a user and a content thereof;
      when a range representing a portion of the first arbitrary item and the content thereof, displayed by the display device, is specified according to a user operation, adding a highlighter, in a color specified by a user, to the range;
      registering, in the memory, highlighter display data including the first arbitrary item added with the highlighter, the color of the highlighter, and the range of the highlighter;
      registering, in the memory, the first arbitrary item added with the highlighter as a word in a wordbook in association with the color of the highlighter and the kind of the dictionary;
      when the wordbook is called up according to a user operation, displaying, on the display device, a list of the wordbook including the first arbitrary item registered as the word in the wordbook, together with a color mark according to the color of the highlighter associated with the first arbitrary item and the kind of the dictionary;
      when a second arbitrary item is selected, according to a second user operation, from the list of the wordbook that is displayed on the display device, reading the second arbitrary item and a content thereof from the items and contents thereof stored by the dictionary storage section, and displaying the second arbitrary item and the content thereof together with a highlighter on the display device by adding the highlighter based on the highlighter display data registered in the memory;
   displaying, on the display device, an item selected from items in the wordbook displayed in the list, together with a highlighter by adding the highlighter, according to an item checkmark instruction received from a user operation;
   registering, in the memory, the first arbitrary item registered as a word in the wordbook as the word in the wordbook, in association with data indicating existence or nonexistence of a checkmark to the item;
   specifying existence or nonexistence of a checkmark of the first arbitrary item according to a user operation; and
   when the wordbook is called up, refining the items registered as words in the wordbook to items associated with data which indicates the specified existence or nonexistence of a checkmark, and displaying a list including the refined items together with a highlighter according to the data which indicates existence of a highlighter as well as a mark which indicates the existence or nonexistence of a checkmark.

2. The electronic apparatus according to claim 1, wherein the processor further performs:
   specifying a color of refinement according to a user operation; and
   when the wordbook is called up, refining items registered as words in the wordbook to items added with the highlighter of the specified color, and displaying the list including the refined items together with a color mark according to the highlighter associated with the refined items.

3. The electronic apparatus according to claim 1, wherein the processor further performs:
   displaying the first arbitrary item and content thereof read from the dictionary while hiding characters in the range marked with the highlighter of the color specified by the user.

4. The electronic apparatus with the dictionary function according to claim 1,
   each dictionary includes data indicating a category to which the dictionary pertains, and the processor further performs:
    registering the first arbitrary item displayed on the display device as the word in the wordbook in association with a color displayed on the display device and data indicating a category of the dictionary that contains the item,
    specifying a category for refinement according to a user operation; and
    refining the items registered as words in the wordbook to items associated with data that indicates the specified category, and displays the refined items together with a color mark according to a color associated with the refined item.

5. A non-transitory computer-readable storage medium that stores a program executed by a computer of an electronic apparatus having a display section capable of providing color display, a storage including a dictionary storage section that stores a plurality of dictionaries, each having a kind and a plurality of items, the plurality of items having contents thereof which are in association with one another, and a memory, the program including a sequence of commands for causing the computer system to perform pieces of processing, the pieces of processing comprising:
    displaying, on the display section, a first item of a dictionary, of the plurality of dictionaries stored by the dictionary storage section, having a kind specified by a user and a content thereof;
    when a range representing at least a portion the first item and the content thereof, displayed on the display device, is specified according to a user operation, adding a highlighter in a color specified by a user to the range;
    registering, in the memory, highlighter display data including the first item added with the highlighter, the color of the highlighter, and the range of the highlighter;
    registering, in the memory, the first item added with the highlighter as a word in a wordbook in association with the color of the highlighter and the kind of dictionary;
    when the wordbook is called up according to a user operation, displaying, on the display section, a list including the first item registered as the word in the wordbook, together with a color mark according to the color of the highlighter associated with the first item and the kind of the dictionary;
    when a second item is selected according to a user operation from the list of the wordbook displayed on the display device, reading the second item and a content thereof from the dictionary stored by the dictionary storage section, and displaying the second item and the content thereof together with a highlighter on the display section by adding the highlighter based on the highlighter display data registered in the memory
    displaying, on the display device, a third item selected from the items in the wordbook displayed in the list, together with a highlighter by adding the highlighter, according to an item checkmark instruction by a user;
    registering, in the memory, the third item registered as a word in the wordbook as a word in the wordbook, in association with data indicating existence or nonexistence of a checkmark to the third item;
    specifying existence or nonexistence of a checkmark of a fourth item according to a user operation; and
    when the wordbook is called up, refining the items registered as words in the wordbook to items associated with data which indicates the specified existence or nonexistence of a checkmark, and displaying a list including the refined items together with a highlighter according to the data which indicates existence of a highlighter as well as a mark which indicates the existence or nonexistence of a checkmark.

6. A dictionary content display method for an electronic apparatus with a dictionary function, which includes a display device capable of providing colored display, a storage including a dictionary storage section that stores plural kinds of dictionaries, each of the dictionaries having a plurality of items and contents of the items which are in association with one another, and a memory, the method comprising:
    displaying, on the display section, a first item in a kind of dictionary specified by a user among the plural kinds of dictionaries stored by the dictionary storage section and a content thereof;
    when a range representing a portion of the first item and the content thereof displayed on the display device is specified according to a first user operation, adding a highlighter in a color specified by a user to the range;
    registering, in the memory, highlighter display data including the first item added with the highlighter, the color of the highlighter, and the range of the highlighter;
    registering, in the memory, the first item added with the highlighter as a word in a wordbook in association with the color of the highlighter and the kind of dictionary;
    when the wordbook is called up according to a second user operation, displaying, on the display section, a list including the first item registered as the word in the wordbook, together with a color mark according to the color of the highlighter associated with the first item and the kind of the dictionary;
    when a second item selected according to a user operation from the list of the wordbook displayed on the display device, reading the second item and content thereof from the dictionary stored by the dictionary storage section, and displaying the second item and the content thereof together with a highlighter on the display section by adding the highlighter based on the highlighter display data registered in the memory
    displaying, on the display device, a third item selected from the items in the wordbook displayed in the list, together with a highlighter by adding the highlighter, according to an item checkmark instruction by a user;
    registering, in the memory, the third item registered as a word in the wordbook as a word in the wordbook, in association with data indicating existence or nonexistence of a checkmark to the third item;
    specifying existence or nonexistence of a checkmark of a fourth item according to a user operation; and
    when the wordbook is called up, refining the items registered as words in the wordbook to items associated with data which indicates the specified existence or nonexistence of a checkmark, and displaying a list including the refined items together with a highlighter according to the data which indicates existence of a highlighter as well as a mark which indicates the existence or nonexistence of a checkmark.

7. The method according to claim 6, wherein the method further comprises:
    specifying a color of refinement according to a user operation; and
    when the wordbook is called up, refining the items registered as words in the wordbook to items added with the highlighter of the specified color, and displaying the list including the refined items together with a color mark according to the highlighter associated with the refined items.

8. The method according to claim 6, wherein the method further comprises:
- displaying the first item and content thereof read from the dictionary while hiding characters in the range marked with the highlighter of the color specified by a user.

9. The method according to claim 6, wherein each dictionary includes data indicating a category to which the dictionary pertains, and the method further comprises:
- registering the first item displayed on the display device as a word in the wordbook in association with a color displayed on the display device and data indicating a category of a dictionary including the first item, specifying a category for refinement according to a user operation; and
- refining the items registered as words in the wordbook to items associated with data that indicates the specified category, and displays the refined items together with a color mark according to a color associated with the refined item.

* * * * *